United States Patent
Hanatsuka et al.

(10) Patent No.: US 9,170,102 B2
(45) Date of Patent: Oct. 27, 2015

(54) METHOD FOR ESTIMATING ROAD SURFACE CONDITION

(75) Inventors: Yasushi Hanatsuka, Kodaira (JP); Yasumichi Wakao, Kodaira (JP); Hiroshi Morinaga, Kodaira (JP)

(73) Assignee: Kabushiki Kaisha Bridgestone, Tokyo (JP)

( * ) Notice: Subject to any disclaimer, the term of this patent is extended or adjusted under 35 U.S.C. 154(b) by 497 days.

(21) Appl. No.: 13/698,228

(22) PCT Filed: Jan. 13, 2011

(86) PCT No.: PCT/JP2011/050417
§ 371 (c)(1),
(2), (4) Date: Nov. 15, 2012

(87) PCT Pub. No.: WO2011/145356
PCT Pub. Date: Nov. 24, 2011

(65) Prior Publication Data
US 2013/0116972 A1 May 9, 2013

(30) Foreign Application Priority Data
May 19, 2010  (JP) .................................. 2010-115730

(51) Int. Cl.
*G06F 19/00* (2011.01)
*G01B 17/08* (2006.01)
(Continued)

(52) U.S. Cl.
CPC ................ *G01B 17/08* (2013.01); *B60T 8/172* (2013.01); *B60W 40/06* (2013.01); *B60T 2210/12* (2013.01); *B60W 40/068* (2013.01)

(58) Field of Classification Search
CPC ....... G08G 1/161; B60W 40/06; B60W 30/16

USPC ...................... 702/167, 60–67, 182–185, 188
See application file for complete search history.

(56) References Cited

U.S. PATENT DOCUMENTS

2009/0055040 A1* 2/2009 Nagaya ............................ 701/29
2011/0118989 A1* 5/2011 Morinaga ........................ 702/34

FOREIGN PATENT DOCUMENTS

| JP | 63-247111 A | 10/1988 |
|---|---|---|
| JP | 2-88810 U | 7/1990 |

(Continued)

OTHER PUBLICATIONS

Communication dated Jun. 9, 2015 from the Japanese Patent Office in counterpart application No. 2014-177242.

*Primary Examiner* — Edward Raymond
(74) *Attorney, Agent, or Firm* — Sughrue Mion, PLLC

(57) ABSTRACT

A method capable of estimating a snowy road surface condition during vehicular travel in finer classification. In this method, tire vibrations in the circumferential direction, road surface temperature (T), and tire-generated sound are detected by an acceleration sensor, a road surface thermometer, and a microphone, respectively. Then band values $P_{11}$, $P_{12}$ and $P_{13}$ for a pre-leading-edge region (R1), band values $P_{21}$, $P_{22}$ and $P_{23}$ for a leading-edge region (R2), band values $P_{31}$, $P_{32}$ and $P_{33}$ for a pre-trailing-edge region (R3), band values $P_{41}$ and $P_{42}$ for a trailing-edge region (R4), and band values $P_{51}$, $P_{52}$ and $P_{53}$ for a post-trailing-edge region (R5) are calculated from the tire vibration data. A sound pressure level ratio $(Q)=(P_A/P_B)$, which is the ratio of a band power value $(P_A)$ of a low frequency band to a band power value $(P_B)$ of a high frequency band, is calculated from data on the tire-generated sound. And a road surface condition is estimated, using the band values $(P_{ij})$, road surface temperature data (T), sound pressure level ratio (Q), and wheel speed data.

8 Claims, 12 Drawing Sheets

(51) Int. Cl.
   *B60T 8/172*   (2006.01)
   *B60W 40/06*   (2012.01)
   *B60W 40/068*  (2012.01)

(56) References Cited

FOREIGN PATENT DOCUMENTS

| | | |
|---|---|---|
| JP | 9-114371 A | 5/1997 |
| JP | 11-126295 A | 5/1999 |
| JP | 2001-101565 A | 4/2001 |
| JP | 2002-145038 A | 5/2002 |
| JP | 2008-65516 A | 3/2008 |
| JP | 2008-162392 A | 7/2008 |
| JP | 2009-32181 A | 2/2009 |
| JP | 2009-123153 A | 6/2009 |

* cited by examiner

METHOD FOR ESTIMATING ROAD SURFACE CONDITION

CROSS REFERENCE TO RELATED APPLICATIONS

This application is a National Stage of International Application No. PCT/JP2011/050417, filed on Jan. 13, 2011, which claims priority from Japanese Patent Application No. 2010-115730, filed on May 19, 2010, the contents of all of which are incorporated herein by reference in their entirety.

TECHNICAL FIELD

The present invention relates to a method for estimating a road surface condition during vehicular travel and, in particular, to a method for estimating the condition of a snowy road surface in finer classification.

BACKGROUND ART

It is desired that road surface conditions during vehicular travel be estimated with accuracy and the estimation be fed back to vehicular control to improve the running safety of vehicles. If road surface conditions can be estimated during vehicular travel, a more advanced control of ABS (antilock braking system) braking, for instance, can be realized before such danger avoidance action as braking, acceleration, or steering is taken. This is expected to further improve the safety of vehicular operation.

In a proposed method for estimating road surface conditions during vehicular travel, tire vibrations during vehicular travel, for example, are detected, and the vibrations in a time region before the leading edge of the contact patch (pre-leading-edge region) are extracted from a time-series waveform of the detected tire vibrations. At the same time, a vibration level ratio R, which is a ratio in magnitude of the vibration component in a high-frequency region (3 kHz to 5 kHz) of the vibrations to the vibration component in a low-frequency region (1 kHz to 2 kHz) thereof, is calculated. Then the road surface condition is estimated to be a high μ road surface or a low μ road surface, from the vibration level ratio R (see Patent Document 1, for instance).

Also, in another proposed method, sounds generated from a tire during vehicular travel are detected, and a mean value of the sound pressure level within a set frequency range of the tire-generated sounds is calculated. Then the mean value is compared with reference values so as to determine whether the road surface is an amply wet asphalt road surface, a slightly wet asphalt road surface, a dry asphalt road surface, or an icy road surface (see Patent Document 2, for instance). In still another proposed method, the ratios between the mean values of sound pressure levels within a plurality of frequency ranges are compared with reference values so as to determine whether the road surface is a snowy road surface, a watery road surface, an icy road surface, or a dry road surface (see Patent Document 3, for instance).

PRIOR ART DOCUMENT

Patent Document

Patent Document 1: WO 2006/135090 A1
Patent Document 2: Japanese Unexamined Patent Application Publication No. 6-174543
Patent Document 3: Japanese Unexamined Patent Application Publication No. 8-261993

SUMMARY OF THE INVENTION

Problem to be Solved by the Invention

Such conventional methods for estimating road surface conditions can determine whether the road surface during vehicular travel is a compacted snowy road surface or an icy road surface, but they cannot determine the snowy road in finer classification such as whether the snowy road is a road covered with freshly-fallen snow or a road covered with sherbet-like snow.

The present invention has been made to solve the foregoing problems, and an object thereof is to provide a method capable of estimating snowy road surface conditions during vehicular travel in finer classification.

Means for Solving the Problem

A first aspect of the invention provides a method for estimating a road surface condition, which includes the steps of
(a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak,
(b) obtaining, from the time-series waveform, a band value $P_{11}$ selected from a band of 2 kHz to 8 kHz of the pre-leading-edge region R1, a band value $P_{12}$ selected from a band of 0.5 kHz to 1.5 kHz of the pre-leading-edge region R1, a band value $P_{21}$ selected from a band of 1 kHz to 3 kHz of the leading-edge region R2, and a band value $P_{51}$ selected from a band of 1 kHz to 4 kHz of the post-trailing-edge region R5, and
(c) estimating whether the road surface during vehicular travel is a snowy road or not, based on the magnitude of the band values $P_{11}$, $P_{12}$, $P_{21}$, and $P_{51}$.

And, in the step (c), the road surface during vehicular travel is estimated to be a snowy road when f1≥0 and also f2<0, where f1 is a function value found by substituting the band values $P_{11}$ and $P_{12}$ in a predetermined discriminant function $F1 = w_{11} \cdot P_{11} + w_{12} \cdot P_{12} - K1$ and f2 is a function value found by substituting the band values $P_{21}$ and $P_{51}$ in a predetermined discriminant function $F2 = w_{21} \cdot P_{21} + w_{22} \cdot P_{51} - K2$.

This method, therefore, makes it possible to estimate the road surface to be a snowy road covered with freshly-fallen snow. Thus, the snowy road condition can be estimated in finer classification by a simple method using only the output of tire acceleration in the circumferential direction or the axial direction detected by an acceleration sensor.

It is to be noted that the band value $P_{ij}$ may be a mean value of vibration levels in a specified frequency range or may be a mean value in a region having frequency levels with particularly large differences depending on conditions within the specified frequency range. Or it may be a mean value or the sum of a predetermined single or plurality of vibration level within a specified frequency range.

Also, the discriminant function used in the determination of this invention is a function for distinguishing two or more sets. Suppose that $P_{11} \geq P_{12}$ when a certain condition A (the condition here is collision of the tire with a covering on the road surface, such as water or snow) is satisfied and $P_{11} < P_{12}$ when the condition A is not satisfied, as represented in FIG. 18. Then the boundary between the set of band values ($P_{11}$, $P_{12}$) satisfying the condition A and the set of band values ($P_{11}$, $P_{12}$) not satisfying the condition A is $P_{11} = P_{12}$. At this time, the discriminant function is $F1 = P_{11} - P_{12}$ ($w_{11} = 1$, $w_{12} = -1$, $K1 = 0$), and the boundary is $F1 = 0$. That is, when ($P_{11}$, $P_{12}$) is substituted in F1, $P_{11} \geq P_{12}$ when $F1 \geq 0$, or $P_{11} < P_{12}$ when $F1 < 0$.

A general discriminant function is $F1 = w_{11} \cdot P_{11} + w_{12} \cdot P_{12} - K1$, and the $w_{11}$, $w_{12}$, and K1 can be calculated from the data on the set of band values ($P_{11}$, $P_{12}$) actually determined for the condition A, using a known method such as least-square, Mahalanobis' generalized distance, or SVM.

The calculations can be performed in a similar manner not only for F2, which is a discriminant function of two variables, but also for F3, F4, F7, and F8, which are discriminant functions of multiple variables.

It should also be appreciated that the function $F'1 = P_{11} - P_{12}$ is also a discriminant function which can perform a discrimination similar to that of the discriminant function $F1 = P_{11} - P_{12}$. When this discriminant function F'1 is used, the signs in the determination are inverted. Note also that similar discrimination can be performed by both the general discriminant function $F = w_1 \cdot P_1 + w_2 \cdot P_2 + \ldots + w_n \cdot P_n - K$ and the discriminant function $F' = w'_1 \cdot P_1 + w'_2 \cdot P_2 + \ldots + w'_n \cdot P_n - K'$ ($w'_k = -w_k$, $K' = -K$). And when the discriminant function F' is used, the signs in the determination are inverted.

A second aspect of the invention provides a method for estimating a road surface condition, which includes the steps of (a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak, (d) obtaining, from the time-series waveform, a band value $P_{52}$ selected from a band of 2 kHz to 4 kHz of the post-trailing-edge region R5 and a band value $P_{345}$ selected from a band of 7 kHz to 10 kHz of the region R345 covering the pre-trailing-edge region R3, the trailing-edge region R4, and the post-trailing-edge region R5 or obtaining, from the time-series waveform, a band value $P_{52}$ selected from a band of 2 kHz to 4 kHz of the post-trailing-edge region R5, a band value $P_{31}$ selected from a band of 7 kHz to 10 kHz of the pre-trailing-edge region R3, a band value $P_{41}$ selected from a band of 7 kHz to 10 kHz of the trailing-edge region R4, and a band value $P_{53}$ selected from a band of 7 kHz to 10 kHz of the post-trailing-edge region R5, and (e) estimating whether the road surface during vehicular travel is a sherbet-like snowy road or not, based on the magnitude of the band values $P_{52}$ and $P_{345}$ or the magnitude of $P_{52}$, $P_{31}$, $P_{41}$, and $P_{53}$.

And, in the step (e), the road surface during vehicular travel is estimated to be a sherbet-like snowy road when f3<0, where f3 is a function value found by substituting the band values $P_{52}$ and $P_{345}$ in a predetermined discriminant function $F3 = w_{31} \cdot P_{52} + w_{32} \cdot P_{345} - K3$, or when f'3<0, where f'3 is a function value found by substituting the band values $P_{52}$, $P_{31}$, $P_{41}$, and $P_{53}$ in a predetermined discriminant function $F'3 = w'_{31} \cdot P_{52} + w'_{32} \cdot P_{31} + w'_{33} \cdot P_{41} + w'_{34} \cdot P_{53} - K'3$.

This method, therefore, makes it possible to estimate the road surface to be a sherbet-like snowy road. Thus, the snowy road condition can be estimated in finer classification by a simple method using only the output of tire acceleration in the circumferential direction or the axial direction detected by an acceleration sensor.

A third aspect of the invention provides a method for estimating a road surface condition, which includes the steps of (a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak, (f) obtaining, from the time-series waveform, a band value $P_{450}$ selected from a band of 1 kHz to 4 kHz of the region R450 covering the trailing-edge region R4 and the post-trailing-edge region R5 or obtaining, from the time-series waveform, a band value $P_{42}$ selected from a band of 1 kHz to 4 kHz of the trailing-edge region R4 and a band value $P_{51}$ selected from a band of 1 kHz to 4 kHz of the post-trailing-edge region R5, and (g) estimating whether the road surface during vehicular travel is an icy road or not, based on or the magnitude of the band value $P_{450}$ or the magnitude of the band values $P_{42}$ and $P_{51}$.

And, in the step (g), the road surface during vehicular travel is estimated to be an icy road when f4<0, where f4 is a function value found by substituting the band value $P_{450}$ in a predetermined discriminant function $F4 = w_{41} \cdot P_{450} - K4$, or when f'4<0, where f'4 is a function value found by substituting the band values $P_{42}$ and $P_{51}$ in a predetermined discriminant function $F'4 = w'_{41} \cdot P_{42} + w'_{42} \cdot P_{51} - K'4$.

This method, therefore, makes it possible to estimate the road surface to be an icy road. Thus, the snowy road condition can be estimated in finer classification by a simple method using only the output of tire acceleration in the circumferential direction or the axial direction detected by an acceleration sensor.

A fourth aspect of the invention provides a method for estimating a condition of road surface, which includes the steps of (a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak, (h) obtaining, from the time-series waveform, a band value $P_{11}$ selected from a band of 2 kHz to 8 kHz of the preleading-edge region R1, a band value $P_{13}$ selected from a band of 1 kHz or below of the pre-leading-edge region R1, a band value $P_{22}$ selected from a band of 2 kHz to 4 kHz of the leading-edge region R2, a band value $P_{23}$ selected from a band of 4 kHz to 10 kHz of the leading-edge region R2, a band value $P_{32}$ selected from a band of 2 kHz to 4 kHz of the pre-trailing-edge region R3, a band value $P_{33}$ selected from a band of 4 kHz to 10 kHz of the pre-trailing-edge region R3, a band value $P_{42}$ selected from a band of 1 kHz to 4 kHz of the trailing-edge region R4, and a band value $P_{51}$ selected from a band of 1 kHz to 4 kHz of the post-trailing-edge region R5, and (i) estimating whether the road surface during vehicular travel is a compacted snowy road or not, based on the magnitude of the band values $P_{11}$, $P_{13}$, $P_{22}$, $P_{23}$, $P_{32}$, $P_{33}$, $P_{42}$, and $P_{51}$.

And, in the step (i), the road surface during vehicular travel is estimated to be a compacted snowy road when f'7<0 and also f8<0, where f'7 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F'7 = w'_{71} \cdot P_{11} + w'_{72} \cdot P_{13} + w'_{73} \cdot P_{22} + w'_{74} \cdot P_{23} + w'_{75} \cdot P_{32} + w'_{76} \cdot P_{33} + w'_{77} \cdot P_{42} + w'_{78} \cdot P_{51} - K'7$ and f8 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F8 = w_{81} \cdot P_{11} + w_{82} \cdot P_{13} + w_{83} \cdot P_{22} + w_{84} \cdot P_{23} + w_{85} \cdot P_{32} + w_{86} \cdot P_{33} + w_{87} \cdot P_{42} + w_{88} \cdot P_{51} - K8$.

This method, therefore, makes it possible to estimate the road surface to be a compacted snowy road. Thus, the snowy road condition can be estimated in finer classification by a simple method using only the output of tire acceleration in the circumferential direction or the axial direction detected by an acceleration sensor.

A fifth aspect of the invention provides a method for estimating a road surface condition, which includes the steps of (A) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak, (B) obtaining, from the time-series waveform, a band value $P_{11}$ selected from a band of 2 kHz to 8 kHz of the pre-leading-edge region R1 and a band value $P_{12}$ selected from a band of 0.5 kHz to 1.5 kHz of the pre-leading-edge region R1, and determining whether f1, which is a function value found by substituting the band values $P_{11}$ and $P_{12}$ in a predetermined discriminant function $F1 = w_{11} \cdot P_{11} + w_{12} \cdot P_{12} - K1$, satisfies f1≥0 or not, (C) when f1≥0 in step (B), obtaining a band value $P_{21}$ selected from a band of 1 kHz to 3 kHz of the leading-edge region R2 and a band value $P_{51}$ selected from a band of 1 kHz to 4 kHz of the post-trailing-edge region R5, determining whether f2, which is a function value found by substituting the band values $P_{21}$ and $P_{51}$ in a predetermined discriminant function $F2 = w_{21} \cdot P_{21} + w_{22} \cdot P_{51} - K2$, satisfies f2<0 or not, and estimating the road surface during vehicular travel to be a snowy road when f2<0, (D) when f2≥0 in step (C), obtaining a band value $P_{52}$ selected from a band of 2 kHz to 4 kHz of the post-trailing-edge region R5 and a band value $P_{345}$ selected from a band of 7 kHz to 10 kHz of the region R345 covering the pre-trailing-edge region R3, the trailing-edge region R4, and the post-trailing-edge region R5 or obtaining a band value $P_{52}$ selected from a band of 2 kHz to 4 kHz of the post-trailing-edge region R5, a band value $P_{31}$ selected from a band of 7 kHz to 10 kHz of the pre-trailing-edge region R3, a band value $P_{41}$ selected from a band of 7 kHz to 10 kHz of the trailing-edge region R4, and a band value $P_{53}$ selected from a band of 7 kHz to 10 kHz of the post-trailing-edge region R5, determining whether f3, which is a function value found by substituting the band values $P_{52}$ and $P_{345}$ in a predetermined discriminant function $F3 = w_{31} \cdot P_{52} + w_{32} \cdot P_{345} - K3$, satisfies f3<0 or not, or whether f'3, which is a function value found by substituting the band values $P_{52}$, $P_{31}$, $P_{41}$, and $P_{53}$ in a predetermined discriminant function $F'3 = w'_{31} \cdot P_{52} + w'_{32} \cdot P_{31} + w'_{33} \cdot P_{41} + w'_{34} \cdot P_{53} - K'3$, satisfies f'3<0 or not, and estimating the road surface during vehicular travel to be a sherbet-like snowy road when f3<0 or f'3<0 or estimating the road surface to be a wet road when f3≥0 or f'3≥0, (E) when f1<0 in step (B), obtaining a band value $P_{450}$ selected from a band of 1 kHz to 4 kHz of the region R450 covering the trailing-edge region R4 and the post-trailing-edge region R5 or obtaining a band value $P_{42}$ selected from a band of 1 kHz to 4 kHz of the trailing-edge region R4 and a band value $P_{51}$ selected from a band of 1 kHz to 4 kHz of the post-trailing-edge region R5, and estimating the road surface to be an icy road when f4<0, where f4 is a function value found by substituting the band value $P_{450}$ in a predetermined discriminant function $F4 = w_{41} \cdot P_{450} - K4$, or when f'4<0, where f'4 is a function value found by substituting the band values $P_{42}$ and $P_{51}$ in a predetermined discriminant function $F'4 = w'_{41} \cdot P_{42} + w'_{42} \cdot P_{51} - K'4$, (F) when f4≥0 or f'4≥0 in step (E), obtaining a band value $P_{11}$ selected from a band of 2 kHz to 8 kHz of the pre-leading-edge region R1, a band value $P_{13}$ selected from a band of 1 kHz or below of the pre-leading-edge region R1, a band value $P_{22}$ selected from a band of 2 kHz to 4 kHz of the leading-edge region R2, a band value $P_{23}$ selected from a band of 4 kHz to 10 kHz of the leading-edge region R2, a band value $P_{32}$ selected from a band of 2 kHz to 4 kHz of the pre-trailing-edge region R3, a band value $P_{33}$ selected from a band of 4 kHz to 10 kHz of the pre-trailing-edge region R3, and a band value $P_{450}$ selected from a band of 1 kHz to 4 kHz of the region R450 covering the trailing-edge region R4 and the post-trailing-edge region R5 or obtaining a band value $P_{11}$ selected from a band of 2 kHz to 8 kHz of the pre-leading-edge region R1, a band value $P_{13}$ selected from a band of 1 kHz or below of the pre-leading-edge region R1, a band value $P_{22}$ selected from a band of 2 kHz to 4 kHz of the leading-edge region R2, a band value $P_{23}$ selected from a band of 4 kHz to 10 kHz of the leading-edge region R2, a band value $P_{32}$ selected from a band of 2 kHz to 4 kHz of the pre-trailing-edge region R3, a band value $P_{33}$ selected from a band of 4 kHz to 10 kHz of the pre-trailing-edge region R3, a band value $P_{42}$ selected from a band of 1 kHz to 4 kHz of the trailing-edge region R4, and a band value $P_{51}$ selected from a band of 1 kHz to 4 kHz of the post-trailing-edge region R5, and estimating the road surface during vehicular travel to be a smooth dry road when f7≥0, where f7 is a function value found by substituting the band values $P_{11}$, $P_{13}$, $P_{22}$, $P_{23}$, $P_{32}$, $P_{33}$, and $P_{450}$ in a predetermined discriminant function $F7 = w_{71} \cdot P_{11} + w_{72} \cdot P_{13} + w_{73} \cdot P_{22} + w_{74} \cdot P_{23} + w_{75} \cdot P_{32} + w_{76} \cdot P_{33} + w_{77} \cdot P_{450} - K7$, or when f'7≥0, where f'7 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F'7 = w'_{71} \cdot P_{11} + w'_{72} \cdot P_{13} + w'_{73} \cdot P_{22} + w'_{74} \cdot P_{23} + w'_{75} \cdot P_{32} + w'_{76} \cdot P_{33} + w'_{77} \cdot P_{42} + w'_{78} \cdot P_{51} - K'7$, and (G) when f7<0 or f'7<0 in step (F), estimating the road surface during vehicular travel to be a compacted snowy road when f8<0 or estimating the road surface during vehicular travel to be a rough dry road when f8≥0, where f8 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F8=w_{81}\cdot P_{11}+w_{82}\cdot P_{13}+w_{83}\cdot P_{22}+w_{84}\cdot P_{23}+w_{85}\cdot P_{32}+w_{86}\cdot P_{33}+w_{87}\cdot P_{42}+w_{88}\cdot P_{51}-K8$.

This method, therefore, makes it possible to estimate the road surface condition in finer classification, that is, as one of the six conditions of "snowy road", "sherbet-like snowy road", "wet road", "compacted snowy road", "icy road", and "dry road" by a simple method using only the output of tire acceleration in the circumferential direction or the axial direction detected by an acceleration sensor.

A sixth aspect of the invention provides a method for estimating a road surface condition, which further includes, between the steps of (E) and (F) of the fifth aspect, the steps of (H) detecting road surface temperature and tire-generated sound during vehicular travel, (I) obtaining a band power value $P_A$ in a low-frequency band and a band power value $P_B$ in a high-frequency band calculated from an octave distribution waveform of 10 Hz to 10 kHz of the tire-generated sound, and (J) determining whether or not there is any covering on the road surface from the road surface temperature and the band power values $P_A$ and $P_B$.

And, in the step (I), it is determined that there is no covering on the road surface if the road surface temperature is lower than a predetermined reference temperature or if the sound pressure level ratio Q, which is the ratio of the band power value $P_B$ in a high-frequency band to the band power value $P_A$ in a low-frequency band ($P_B/P_A$), is less than 1, and the procedure goes on to step (F). Or if it is determined that there is a covering on the road surface in the step (I), a band value $P_{52}$ selected from a band of 2 kHz to 4 kHz of the post-trailing-edge region R5 and a band value $P_{345}$ selected from a band of 7 kHz to 10 kHz of the region R345 covering the pre-trailing-edge region R3, the trailing-edge region R4, and the post-trailing-edge region R5 are obtained or a band value $P_{52}$ selected from a band of 2 kHz to 4 kHz of the post-trailing-edge region R5, a band value $P_{31}$ selected from a band of 7 kHz to 10 kHz of the pre-trailing-edge region R3, a band value $P_{41}$ selected from a band of 7 kHz to 10 kHz of the trailing-edge region R4, and a band value $P_{53}$ selected from a band of 7 kHz to 10 kHz of the post-trailing-edge region R5 are obtained. Then it is determined whether f3≥0 or f'3≥0, where f3 is a function value found by substituting the band values $P_{52}$ and $P_{345}$ in a predetermined discriminant function $F3=w_{31}\cdot P_{52}+w_{32}\cdot P_{345}-K3$ and f'3 is a function value found by substituting the band values $P_{52}$, $P_{31}$, $P_{41}$, and $P_{53}$ in a predetermined discriminant function $F'3=w'_{31}\cdot P_{52}+w'_{32}\cdot P_{31}+w'_{33}\cdot P_{41}+w'_{34}\cdot P_{53}-K'3$. And the road surface during vehicular travel is estimated to be a shallowly sherbet-like snowy road when f3<0 or f'3<0, or the road surface is estimated to be a shallowly wet road when f3≥0 or f'3≥0.

This method, therefore, makes it possible to estimate the "sherbet-like snowy road" and "wet road" in even finer classification, that is, as "shallowly sherbet-like snowy road" and "deeply sherbet-like snowy road" and "shallowly wet road" and "deeply wet road", respectively. Thus, the accuracy of estimation of a road surface condition can be further improved.

A seventh aspect of the invention provides a method for estimating a road surface condition, in which a monitoring acceleration sensor is installed on the suspension of the vehicle, and the estimation of a road surface condition is discontinued when the value of acceleration detected by the monitoring acceleration sensor exceeds a predetermined threshold.

As a result, when an excessive force input to the tire, such as when the tire runs on a large bump or a curb, has occurred, the estimation data on the road surface condition during the process can be deleted. Accordingly, it is possible to avoid erroneous estimation of a road surface condition and thereby improve the accuracy of estimation.

An eighth aspect of the invention provides a method for estimating a road surface condition, in which images of road surface conditions are captured, the images captured of road surface conditions are displayed on a display screen, and estimated road surface conditions are also displayed on the display screen.

As a result, the driver can visually confirm the estimation of a road surface condition and the actual condition of the road surface during vehicular travel in synchronism with each other. Therefore, the safety of vehicular operation can be improved.

Also, it is to be understood that the foregoing summary of the invention does not necessarily recite all the features essential to the invention, and subcombinations of all these features are intended to be included in the invention.

BEST MODE FOR CARRYING OUT THE INVENTION

Hereinafter, the invention will be described based on preferred embodiments which do not intend to limit the scope of the claims of the present invention but exemplify the invention. All of the features and the combinations thereof described in the embodiments are not necessarily essential to the invention.

Figure 1:
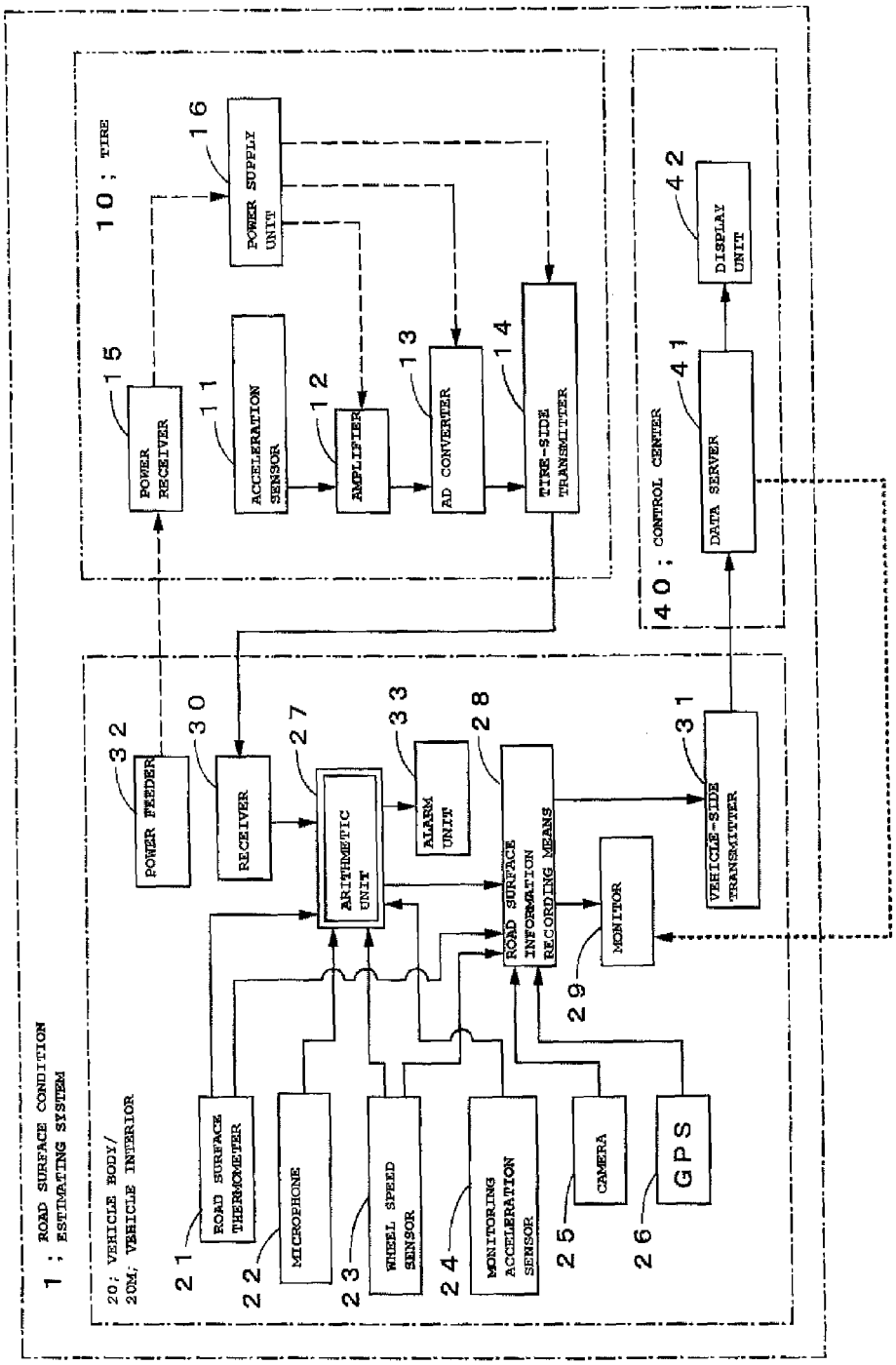
FIG. 1 is a functional block diagram showing a structure of a road surface condition estimating system in accordance with a preferred embodiment of the present invention.

FIG. 1 is a functional block diagram showing a constitution of a road surface condition estimating system 1 according to preferred embodiments of the present invention. The constituting units of the road surface condition estimating system 1 are divided into groups and installed on a tire 10 fitted on a vehicle, on a vehicle body 20 or in a vehicle interior 20M, and in a control center 40 which accumulates and controls data on estimated road surface condition and the like, respectively.

Disposed on the tire 10 are an acceleration sensor 11, an amplifier 12, an AD converter 13, a tire-side transmitter 14, a power receiver 15, and a power supply unit 16. Disposed on the vehicle body 20 or in the vehicle interior 20M are a road surface thermometer 21, a microphone 22, a wheel speed sensor 23, a monitoring acceleration sensor 24, a camera 25, a GPS 26, an arithmetic unit 27, a road surface information recording means 28, a monitor 29, a receiver 30, a vehicle-side transmitter 31, a power feeder 32, and an alarm unit 33. And disposed in the control center 40 are a data server 41 and a display unit 42.

Figure 2A:
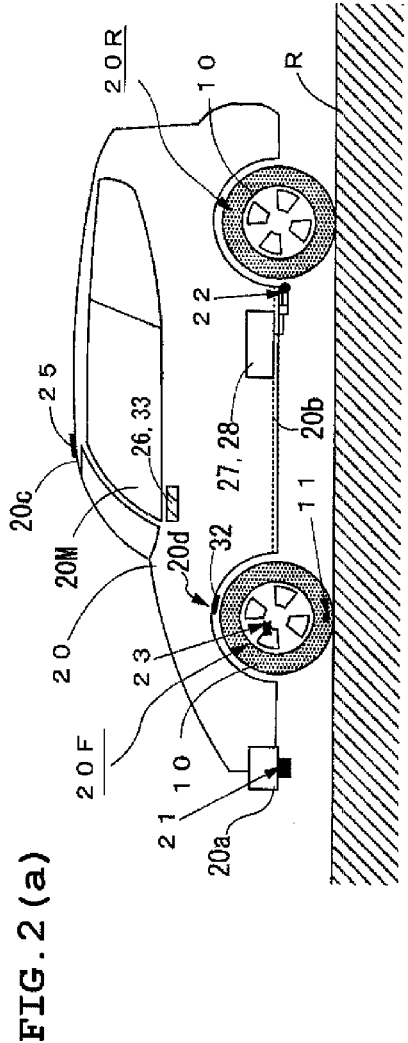
FIG. 2 is an illustration showing the locations of sensors and other devices.
Figure 2C:
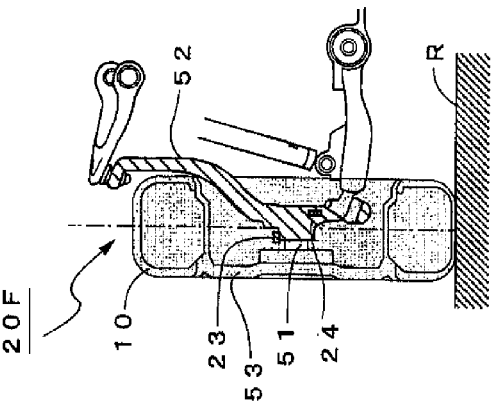
Figure 2B:
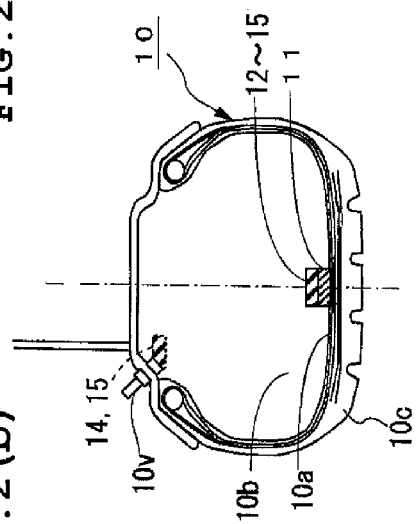

The acceleration sensor 11 is located at a substantially middle portion on the tire air chamber 10b side of the inner liner 10a of the tire 10 of a front wheel 20F as shown in FIG. 2 and detects the vibration inputted to the tread 10c of the tire 10 from a road surface R. Note that, in the present embodiment, the detecting direction of the acceleration sensor 11 is so arranged to be a circumferential direction of the tire.

The amplifier 12, which is equipped with a low-pass filter, removes high-frequency sound components from a time-series waveform of the circumferential vibrations of the tire detected by the acceleration sensor 11 (acceleration waveform) and outputs the result to the AD converter 13.

The AD converter 13 outputs an AD-converted acceleration waveform to the tire-side transmitter 14.

The tire-side transmitter 14 transmits wirelessly the AD-converted acceleration waveform to the receiver 30 installed on the vehicle body 20.

The power receiver 15 receives an RF signal for power supply transmitted from the power feeder 32 and outputs it to the power supply unit 16. In the present embodiment, the power receiver 15 is constructed of receiving coils, and a plurality of receiving coils are arranged at regular intervals along the circumference of the tire 10. Thus, the RF signal can be received nearly continuously when the tire 10 is rotating.

The power supply unit 16 charges a capacitor by converting the RF signal received by the power receiver 15 into electric power, thereby supplying power to the amplifier 12, the AD converter 13, and the tire-side transmitter 14. The tire-side transmitter 14 and the power receiver 15 may be disposed on the inner liner 10a integrally with the acceleration sensor 11, but may also be attached to the inflation valve 10v of the tire 10.

The road surface thermometer 21 may comprise an infrared temperature sensor, for instance. The road surface thermometer 21 is installed on the underside of the front bumper 20a of the vehicle body 20 and measures the temperature of a road surface R by measuring the thermal radiation from the road surface R whose wavelengths are in the infrared region. The data on the temperature measured by the road surface thermometer 21 is outputted to the arithmetic unit 27 and the road surface information recording means 28.

The microphone 22 is installed on the underside of a frame 20b in front of a rear wheel 20R on the vehicle body 20 and detects sound pressure signals of tire-generated sounds. The tire-generated sound occurs in the vicinity of contact patch when the tire 10 on the rear wheel 20R comes in contact with the road surface R when the vehicle is traveling. The sound pressure signals of tire-generated sound detected by the microphone 22 are outputted to the arithmetic unit 27.

The wheel speed sensor 23 detects the rotation speed of the wheel (hereinafter referred to as "wheel speed"). In the present embodiment, the wheel speed sensor 23 includes a rotor having teeth along its outer periphery and rotating together with the wheel, a yoke constituting a magnetic circuit together with the rotor, and a coil for detecting the change of magnetic flux of the magnetic circuit. And the sensor used is a known electromagnetic induction type wheel speed sensor that detects the rotation angle of the wheel (front wheel 20F here). The yoke and the coil are attached to a knuckle 52 which is rotatably mounted on an axle 51. The data on the wheel speed detected by the wheel speed sensor 23 is outputted to the arithmetic unit 27 and the road surface information recording means 28.

The monitoring acceleration sensor 24, which is installed on the knuckle 52, detects tread vibrations (acceleration of the suspension) propagated to the unsprung portion of the vehicle from the tire 10 via the wheel 53. The data on the vibrations of the unsprung portion of the vehicle detected by the monitoring acceleration sensor 24 is outputted to the arithmetic unit 27.

The camera 25 may be a CCD color camera, for instance. The camera 25, which is installed on the roof 20c of the vehicle body as shown in FIG. 2, takes a shot of the road surface (road surface before the vehicle) R on which the vehicle is about to pass. The GPS 26, which is installed near the driver's seat in the vehicle interior 20M, measures the absolute position of the vehicle on the ground. The image data on the images captured by the camera 25 and the position data of the vehicle measured by the GPS 26 are outputted to the road surface information recording means 28.

The arithmetic unit 27 estimates a road surface condition during vehicular travel, using data on tire vibrations detected by the acceleration sensor 11, data on road surface temperatures detected by the road surface thermometer 21, data on tire-generated sound detected by the microphone 22, and data on wheel speeds detected by the wheel speed sensor 23. The data on tire vibrations is transmitted from the tire-side transmitter 14 to the receiver 30 and outputted from the receiver 30 to the arithmetic unit 27. The arithmetic unit 27 will be described in detail later.

The road surface information recording means 28 generates display image data synthesizing the road surface condition during vehicular travel estimated by the arithmetic unit 27, the image data of images captured by the camera 25, the positional data of the vehicle measured by the GPS 26, the data on the temperature measured by the road surface thermometer 21, and the data on the wheel speed detected by the wheel speed sensor 23 and outputs it to the monitor 29 and the vehicle-side transmitter 31. The monitor 29 displays the display image data inputted from the road surface information recording means 28 on the display screen. The arithmetic unit 27 and the road surface information recording means 28, which run on their respective microcomputer software, are installed near the driver's seat together with the monitor 29.

The receiver 30 receives data on tire vibrations sent from the tire-side transmitter 14 and outputs the data to the arithmetic unit 27.

The vehicle-side transmitter 31 transmits the vehicle-related information (information on a road surface condition estimated, image data on the road surface R, positional data on the vehicle, data on the temperature of the road surface R, and data on wheel speed) inputted from the road surface information recording means 28 to the data server 41 of the control center 40.

The power feeder 32 is equipped with a high-frequency generating means and a power-feeding coil. The power feeder 32 transmits the high-frequency wave generated by the high-frequency generating means as an RF signal for power feeding from the power-feeding coil to the power receiver 15. The power feeder 32 is installed on a tire housing 20d of the vehicle body 20 in a position opposite to the not-shown receiving coil of the power receiver 15 attached to the tire 10.

The alarm unit 33, which is located near the driver's seat, causes the alarm LED to light up or blink on and off to warn the driver to drive carefully when the road surface is estimated to be a deeply wet surface or an icy surface. The arrangement may also be such that an alarm buzzer is driven to warn the driver of the likelihood of hydroplaning or that the alarm buzzer and LED are used in combination.

The data server 41 of the control center 40 gathers and stores information sent from the vehicles carrying the road surface condition estimating system 1. At the same time, the data server 41 prepares, from the gathered data, statistical data, such as, for instance, map data of a region of a predetermined size combined with the data on road surface conditions in the region.

The display unit 42 displays statistical data or the data from a specific vehicle on the display screen. The arrangement may be such that intercommunication between the control center 40 and the vehicles involved in the area is provided. Then the drivers of the vehicles traveling on the roads in the predetermined area can be warned or alerted about the road conditions as the statistical data prepared by the data server 41 is fed back to the vehicles. In this manner, the running safety of the vehicles can be further improved.

Figure 3:
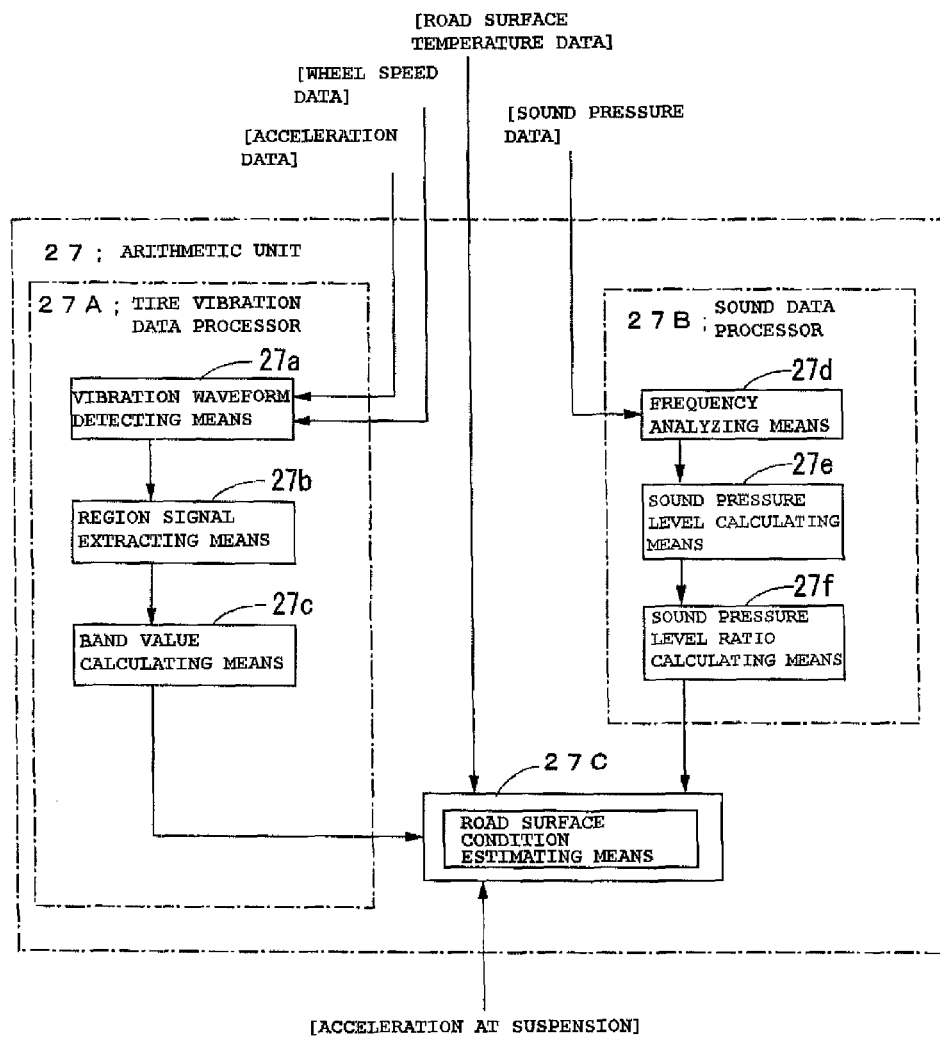
FIG. 3 is a functional block diagram showing a structure of an arithmetic unit for the estimation of a road surface condition.

As shown in FIG. 3, the arithmetic unit 27 includes a tire vibration data processor 27A, a sound data processor 27B, and a road surface condition estimating means 27C.

The tire vibration data processor 27A includes a vibration waveform detecting means 27a, a region signal extracting means 27b, and a band value calculating means 27c. The tire vibration data processor 27A converts data on tire vibrations detected by the acceleration sensor 11 into band values $P_{ij}$ and outputs them to the road surface condition estimating means 27C.

Figure 4A:
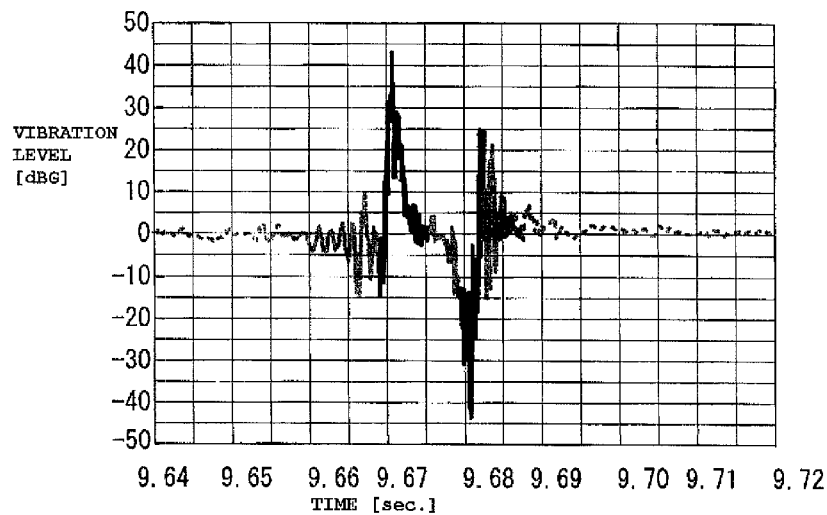
FIG. 4 is diagrams showing the pre-leading-edge region, the leading-edge region, the pre-trailing-edge region, the trailing-edge region, and the post-trailing-edge region of a time-series waveform of tire vibrations.

The vibration waveform detecting means 27a calculates the time for a single revolution of the tire from the leading-edge peak position or the trailing-edge peak position, as shown in FIG. 4A, of acceleration signals, which are the output signals of the acceleration sensor 11, and at the same time detects an acceleration waveform for a single tire revolution using the wheel speed detected by the wheel speed sensor 23.

Figure 4B:
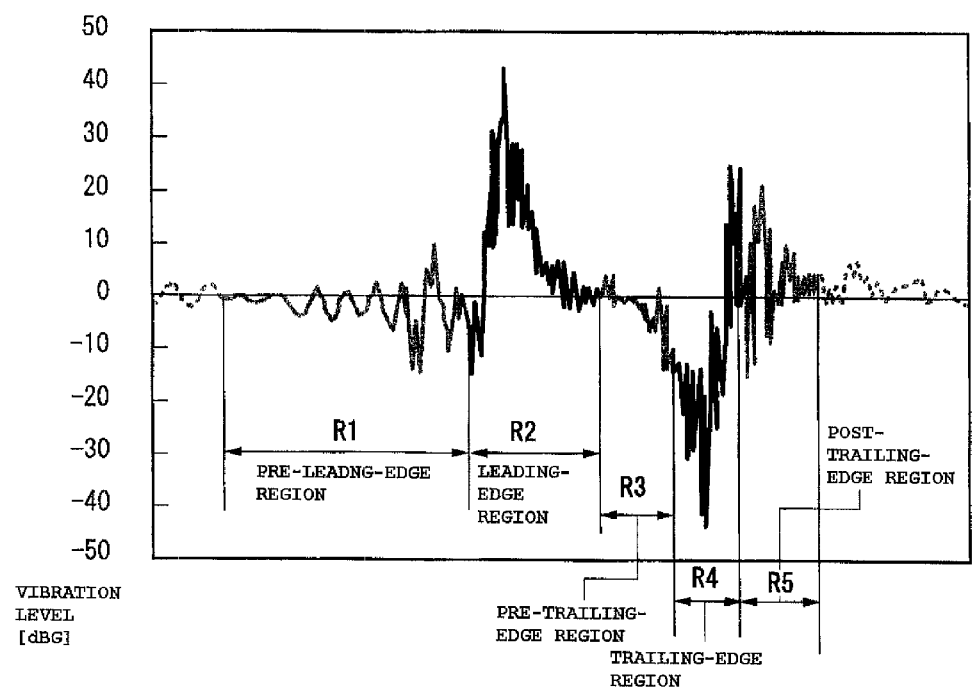

The region signal extracting means 27b divides the acceleration waveform for a single tire revolution into a pre-leading-edge region R1, which precedes the leading-edge peak appearing at the leading edge of contact patch, a leading-edge region R2, which is the region constituting the leading-edge peak, a pre-trailing-edge region R3, which falls between the leading-edge peak and the trailing-edge peak appearing at the trailing edge, a trailing-edge region R4, which is the region constituting the trailing-edge peak, and a post-trailing-edge region R5, which follows the trailing-edge peak, as shown in FIG. 4B, and extracts the time-series waveforms of vibration level in the regions R1 to R5, respectively.

The band value calculating means 27c passes the time-series waveforms of the regions R1 to R5 through bandpass filters and calculates the band values $P_{ij}$, which are the magnitudes of vibration components in the predetermined frequency ranges, as listed below. Note that the index i represents the region, and the index j the frequency range extracted.

The bandpass filters to be used are for the following frequency ranges:

$P_{11}$: a band value selected from a band of 2 kHz to 8 kHz of the pre-leading-edge region R1,
$P_{12}$: a band value selected from a band of 0.5 kHz to 1.5 kHz of the pre-leading-edge region R1,
$P_{13}$: a band value selected from a band of 1 kHz or below of the pre-leading-edge region R1,
$P_{21}$: a band value selected from a band of 1 kHz to 3 kHz of the leading-edge region R2,
$P_{22}$: a band value selected from a band of 2 kHz to 4 kHz of the leading-edge region R2,
$P_{23}$: a band value selected from a band of 4 kHz to 10 kHz of the leading-edge region R2,
$P_{31}$: a band value selected from a band of 7 kHz to 10 kHz of the pre-trailing-edge region R3,
$P_{32}$: a band value selected from a band of 2 kHz to 4 kHz of the pre-trailing-edge region R3,
$P_{33}$: a band value selected from a band of 4 kHz to 10 kHz of the pre-trailing-edge region R3,
$P_{41}$: a band value selected from a band of 7 kHz to 10 kHz of the trailing-edge region R4,
$P_{42}$: a band value selected from a band of 1 kHz to 4 kHz of the trailing-edge region R4,
$P_{51}$: a band value selected from a band of 1 kHz to 4 kHz of the post-trailing-edge region R5,
$P_{52}$: a band value selected from a band of 2 kHz to 4 kHz of the post-trailing-edge region R5,
$P_{53}$: a band value selected from a band of 7 kHz to 10 kHz of the post-trailing-edge region R5

The sound data processor 27B includes a frequency analyzing means 27d, a sound pressure level calculating means 27e, and a sound pressure level ratio calculating means 27f. The sound data processor 27B calculates the sound pressure level ratio Q ($=P_B/P_A$) and outputs it to the road surface condition estimating means 27C.

Figure 5:
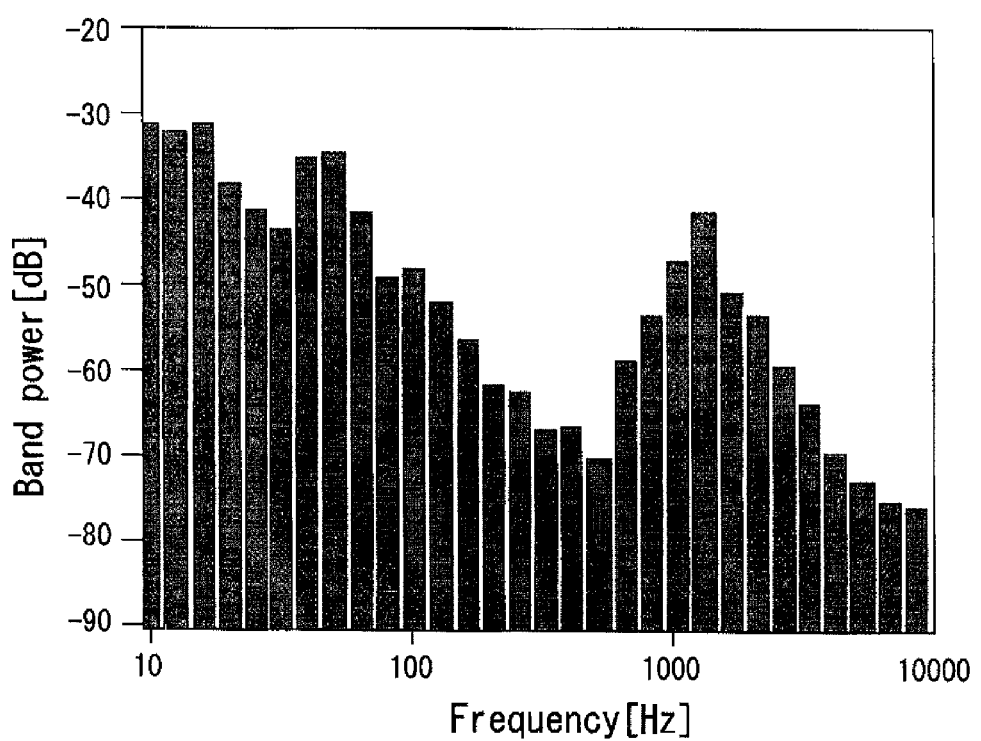
FIG. 5 is a diagram showing an octave distribution waveform of sound pressure signals.

The frequency analyzing means 27d performs a 1/N octave analysis on the sound pressure signals of tire-generated sound and thereby derives a distribution waveform (octave distribution waveform) of the sound signals as shown in FIG. 5. The octave distribution waveform is obtained by measuring a sound pressure level (band power) for each of the octave bands which are 1/N octave band divisions. In this embodiment, N=3.

The sound pressure level calculating means 27e calculates a band power value $P_A$ in a low-frequency band (e.g., 500 Hz) and a band power value $P_B$ in a high-frequency band (e.g., 9000 Hz) from the octave distribution waveform.

The sound pressure level ratio calculating means 27f calculates a sound pressure level calculation value from the band power value $P_A$ in the low-frequency band and the band power value $P_B$ in the high-frequency band. In the present embodiment, the sound pressure level calculation value employed is a sound pressure level ratio Q, which is the ratio of the band power value $P_B$ in the high-frequency band to the band power value $P_A$ in the low-frequency band. That is, $Q=(P_B/P_A)$.

The road surface condition estimating means 27C determines the road surface to be in one of eight conditions, namely, "snowy road", "shallowly sherbet-like snowy road", "deeply sherbet-like snowy road", "shallowly wet road", "deeply wet road", "icy road", "compacted snowy road", and "dry road", using the band values $P_{ij}$ of tire vibrations in the circumferential direction inputted from the tire vibration data processor 27A, the sound pressure level ratio Q inputted from the sound data processor 27B, and the data on the road surface temperature T inputted from the road surface thermometer 21, and outputs the result of the determination to the road surface information recording means 28. Note that it is also possible to determine the "dry road" to be either "rough dry road" or "smooth dry road".

Also, it should be noted that when the road surface is determined to be a deeply wet road or an icy road, the result of this determination is outputted to the alarm unit 33. Note also that when the value of acceleration at the suspension detected by the monitoring acceleration sensor 24 has exceeded a preset threshold, the road surface condition estimating means 27C discontinues the process of determining the road surface condition.

Figure 6:
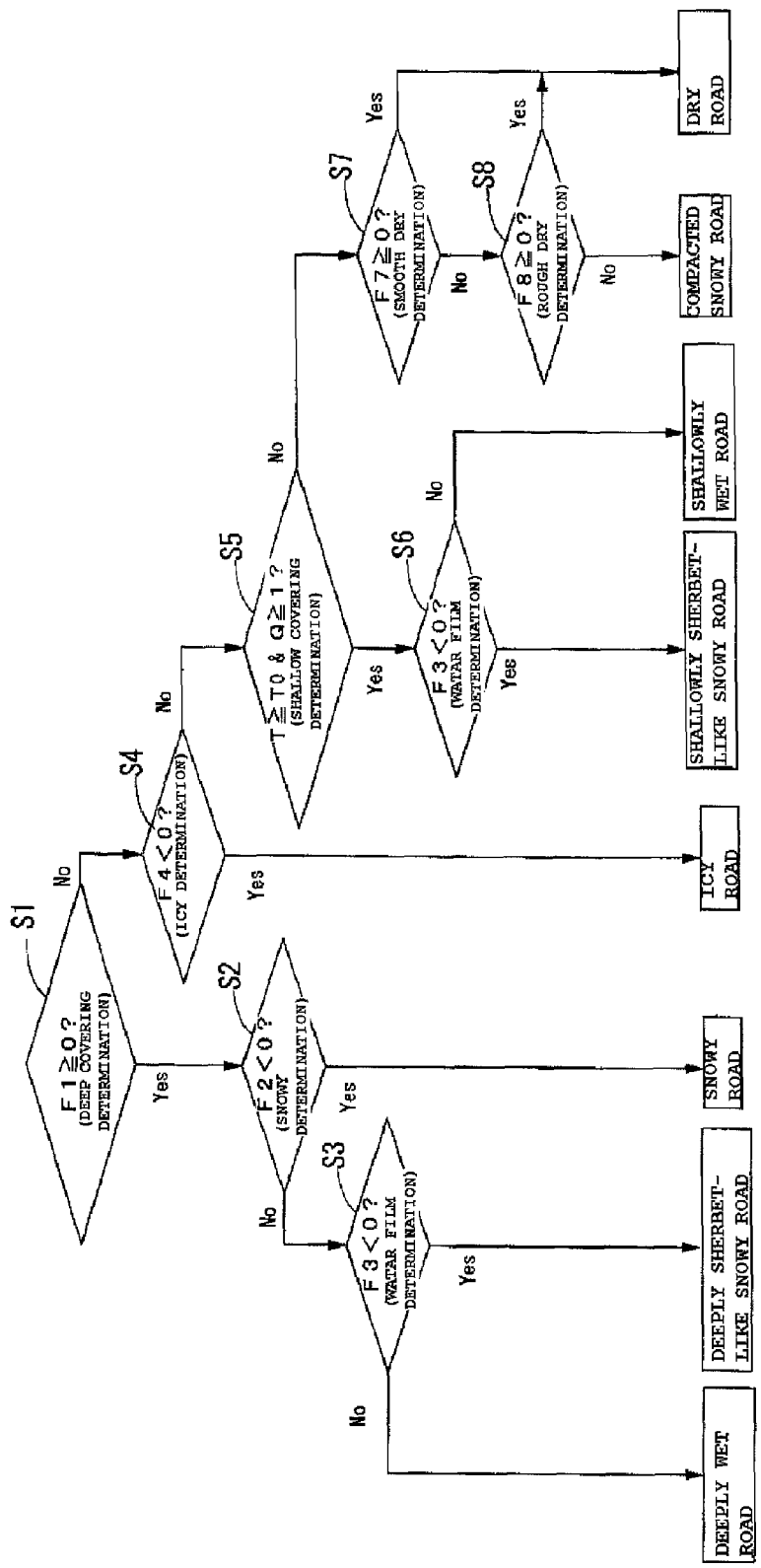
FIG. 6 is a flowchart showing a method for estimating a road surface condition in accordance with the present invention.

Hereinbelow, a method for estimating a road surface condition is explained referring to the flowchart of FIG. 6.

First it is determined whether there is any covering, such as water or snow, on the road surface or not (step S1).

Figure 7:
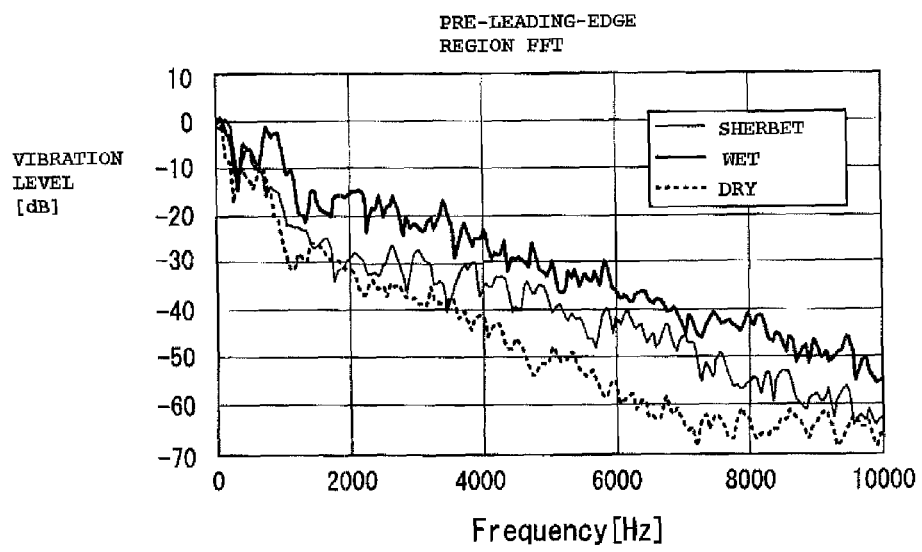
FIG. 7 is a diagram showing an example of frequency spectrums in the pre-leading-edge region.

When there is any covering, such as water or snow, on the road surface, the tire collides with water film or snow when it engages the road surface. Therefore, the band value $P_{11}$ selected from a band of 2 kHz to 8 kHz of the pre-leading-edge region R1 is of larger values for wet road or sherbet-like snowy road than for dry road, as evidenced in the frequency spectrums obtained by performing an FFT frequency analysis on the time-series waveforms in the pre-leading-edge region R1 shown in FIG. 7. However, the band value $P_{12}$ selected from a band of 0.5 kHz to 1.5 kHz of the pre-leading-edge region R1 shows smaller differences between the road surface conditions. Accordingly, the difference between the band value $P_{11}$ and the band value $P_{12}$ (difference in dB), $P_{11}-P_{12}$, is obtained with the band value $P_{12}$ as the reference value, and also a threshold K1 is set for the difference, $P_{11}-P_{12}$. And when the difference, $P_{11}-P_{12}$, is equal to or greater than the threshold K1, it is determined that there is some covering, such as water or snow, on the road surface. Also, when the difference, $P_{11}-P_{12}$, is smaller than the threshold K1, it is determined that there is no covering, such as water or snow, on the road surface or that, even if there is any, the water film or the sherbet-like snow is thin.

In the example of this embodiment, the relationship between the band value $P_{11}$ and the band value $P_{12}$ for various road surface conditions was experimentally derived in advance, and a discriminant function was set as $F1=w_{11} \cdot P_{11}+w_{12} \cdot P_{12}-K1$. And it is determined whether there is any covering, such as water or snow, on the road surface or not by seeing whether f1, which is the function value found by substituting the actually calculated band value $P_{11}$ and band value $P_{12}$ into the discriminant function F1, satisfies f1≥0 or not. Note that the coefficient $w_{11}$ of the discriminant function is about +1 and the coefficient $w_{12}$ is about −1.

When f1≥0 in step S1, the procedure goes to step S2, and the covering on the road surface is determined to be a soft cover of fresh snow or not.

Figure 8:
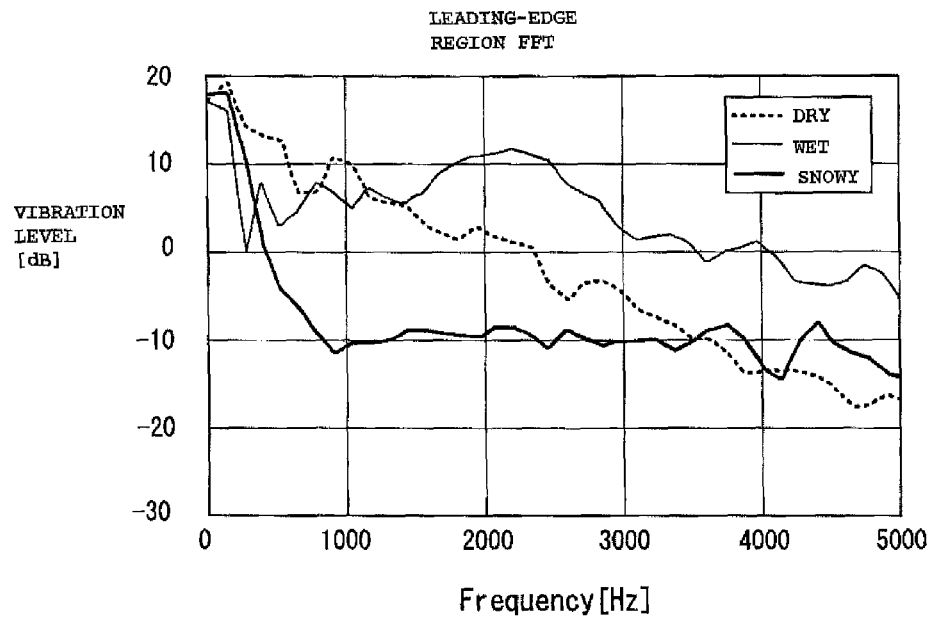
FIG. 8 is a diagram showing an example of frequency spectrums in the leading-edge region.
Figure 9:
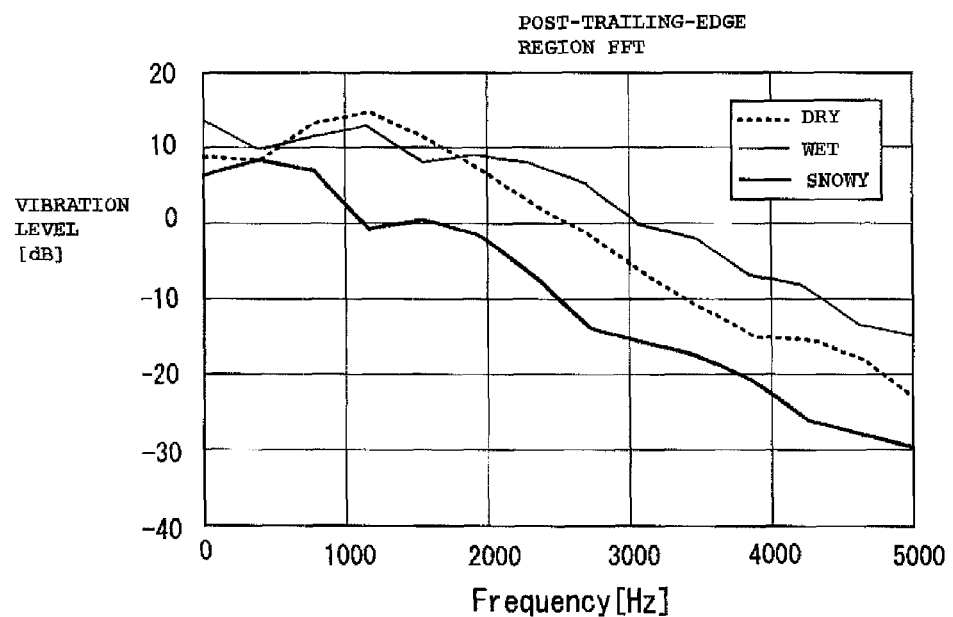
FIG. 9 is a diagram showing an example of frequency spectrums in the post-trailing-edge region.

If the covering is freshly-fallen snow, the impact to the tire as it engages the road surface is reduced, but the road surface becomes slippery. Accordingly, as evidenced by the frequency spectrums in the leading-edge region R2 in FIG. 8, the band value $P_{21}$ selected from a band of 1 kHz to 3 kHz of the leading-edge region R2 on a snowy road is of values smaller than those on a wet road or a dry road. At the same time, as evidenced by the frequency spectrums in the post-trailing-edge region R5 in FIG. 9, the band value $P_{51}$ selected from a band of 1 kHz to 4 kHz of the post-trailing-edge region R5 on a snowy road is of values smaller, too.

Therefore, a threshold may be set for the band value $P_{21}$, the band value $P_{51}$, or the sum $P_{2151}$, which is the sum of the band value $P_{21}$ and the band value $P_{51}$, and then the road surface can be determined to be a snowy road covered with freshly-fallen snow when the $P_{21}$, the $P_{51}$, or the sum $P_{2151}$ is smaller than the threshold.

In the example of this embodiment, the relationship between the band value $P_{21}$ and the band value $P_{51}$ for various road surface conditions was experimentally derived in advance, and a discriminant function was set as $F2=w_{21} \cdot P_{21}+w_{22} \cdot P_{51}-K2$. And it is determined whether the road surface is a snowy road or not by seeing whether f2, which is the function value found by substituting the actually calculated band value $P_{21}$ and band value $P_{51}$ into the discriminant function F2, satisfies f2<0 or not. Note that the coefficient $w_{21}$ and the coefficient $w_{22}$ of the discriminant function are both about +1.

When f2≥0 in step S2, the procedure goes to step S3, and the covering on the road surface is determined to be water or snow, that is, deeply wet road or deeply sherbet-like snowy road.

Figure 10:
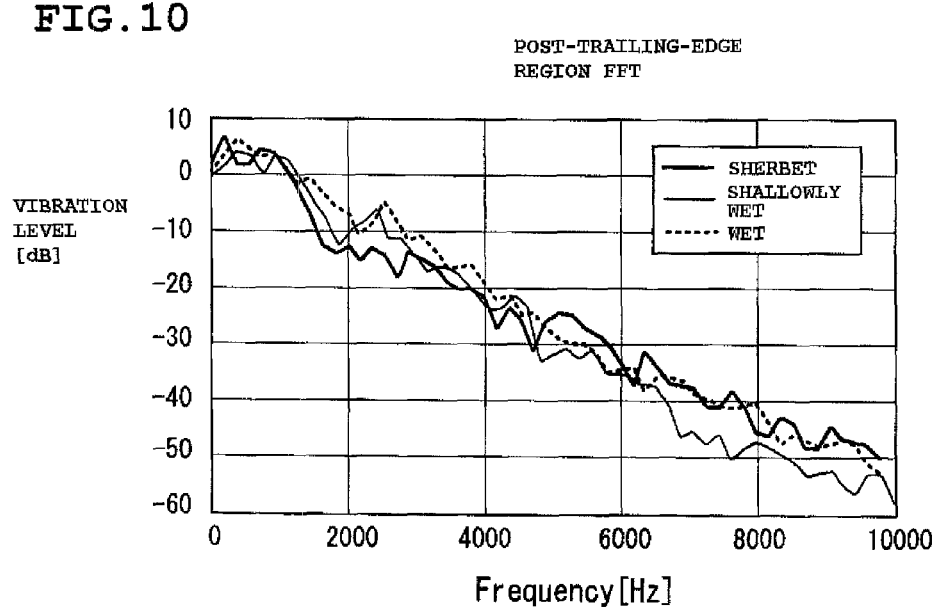
FIG. 10 is a diagram showing another example of frequency spectrums in the post-trailing-edge region.
Figure 11:
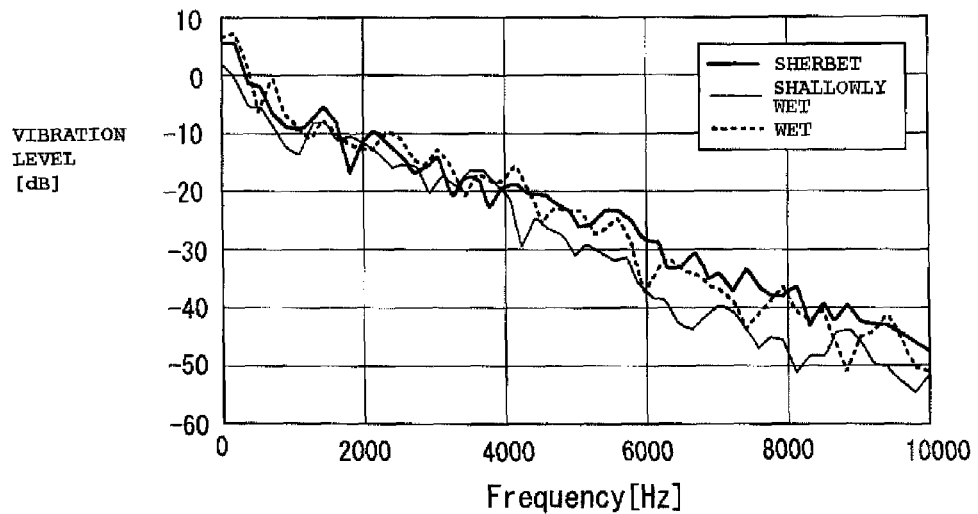
FIG. 11 is a diagram showing an example of frequency spectrums in the pre-trailing-edge region.

If the covering is sherbet-like snow, the vibration component in a high frequency range of the trailing-edge vibrations becomes larger than when the covering is water. On the other hand, the road surface becomes slippery, and therefore the vibration component in a low frequency range becomes large. Accordingly, as evidenced by the frequency spectrums in the post-trailing-edge region R5 in FIG. 10, the band value $P_{52}$ selected from a band of 2 kHz to 4 kHz of the post-trailing-edge region R5 is of values smaller for a sherbet-like snowy road, and the band value $P_{53}$ selected from a band of 7 kHz to 10 kHz is of values larger for a sherbet-like snowy road. On the other hand, as evidenced by the frequency spectrums in the pre-trailing-edge region R3 in FIG. 11, the band value $P_{31}$ selected from a band of 7 kHz to 10 kHz of the pre-trailing-edge region R3 is of values larger for a sherbet-like snowy road. Also, the band value $P_{41}$ selected from a band of 7 kHz to 10 kHz of the trailing-edge region R4 is of values larger.

Therefore, it is possible to determine whether the covering is water or sherbet-like snow from the band values $P_{52}$, $P_{31}$, $P_{41}$, and $P_{53}$, or the difference of the band values $P_{52}$ with the band value $P_{31}$, $P_{41}$, or $P_{53}$. When there are many parameters as in this case, it is preferable that the road surface is determined to be a sherbet-like snowy road or not by setting a predetermined discriminant function $F'3(=w'_{31} \cdot P_{52}+w'_{32} \cdot P_{31}+w'_{33} \cdot P_{41}+w'_{34} \cdot P_{53}-K'3)$ for the band values $P_{52}$, $P_{31}$, $P_{41}$, and $P_{53}$ representing various road surface conditions. That is, when f'3≥0, where f'3 is a function value found by substituting the band values $P_{52}$, $P_{31}$, $P_{41}$, and $P_{53}$ in the predetermined discriminant function F'3, the road surface is determined to be a deeply wet road, and when f'3<0, it is determined to be a sherbet-like snowy road. This will achieve a higher accuracy than when the band values $P_{52}$, $P_{31}$, $P_{41}$, and $P_{53}$, or the difference of the band values $P_{52}$ with the band value $P_{31}$, $P_{41}$, or $P_{53}$ is used in the determination.

Also, the arrangement may be such that a band value $P_{345}$ selected from a band of 7 kHz to 10 kHz of the region R345 covering the pre-trailing-edge region R3, the trailing-edge region R4, and the post-trailing-edge region R5, in place of the band values $P_{31}$, $P_{41}$, and $P_{53}$, is obtained, and the road surface during vehicular travel is determined to be a sherbet-like snowy road when f3<0, where f3 is a function value found by substituting the band values $P_{345}$ and $P_{52}$ in a predetermined discriminant function $F3=w_{31}\cdot P_{52}+w_{32}\cdot P_{345}-K3$.

When f1<0 in step S1, the procedure goes to step S4, and the road surface is determined to slippery or not. A slippery road surface other than a snowy road, a sherbet-like snowy road, and a deeply wet road is an icy road. Therefore, in step S4, the road surface is determined to be an icy road or not.

Figure 12:
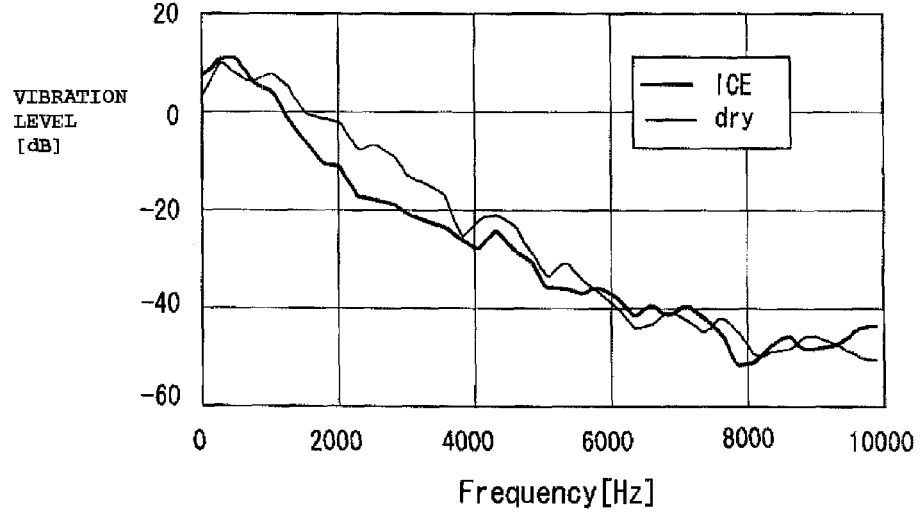
FIG. 12 is a diagram showing another example of frequency spectrums in the post-trailing-edge region.

When the road surface is slippery, especially the band value $P_{42}$ selected from a band of 1 kHz to 4 kHz of the trailing-edge region R4 and the band value $P_{51}$ selected from a band of 1 kHz to 4 kHz of the post-trailing-edge region R5, as evidenced by the frequency spectrums in the post-trailing-edge region R5 in FIG. 12, show smaller values. Therefore, the road surface is determined to be an icy road when f'4<0, where f'4 is the function value found by substituting the band values $P_{41}$ and $P_{51}$ into the predetermined discriminant function $F'4=w'_{41}\cdot P_{42}+w'_{42}\cdot P_{51}-K'4$. Or when f'4≥0, the procedure goes to step S5.

Also, the arrangement may be such that a band value $P_{450}$ selected from a band of 1 kHz to 4 kHz of the region R450 covering the trailing-edge region R4 and the post-trailing-edge region R5, in place of the band values $P_{42}$ and $P_{51}$, is obtained, and the road surface during vehicular travel is determined to be an icy road when f4<0, where f4 is a function value found by substituting the band value $P_{450}$ in a predetermined discriminant function $F4=w_{41}\cdot P_{450}-K4$.

In step S5, it is determined whether there is a thin water film or shallow sherbet-like snow on the road surface or not. When the water film or the layer of sherbet-like snow is thin, the determination in step S1 may suggest the absence of water film or sherbet-like snow. In this step, therefore, it is determined whether there is a thin water film or shallow sherbet-like snow on the road surface or not, using the road surface temperature T during vehicular travel and the sound pressure level ratio $Q (=P_B/P_A)$.

More specifically, the data on road surface temperature T is compared with a predetermined reference temperature $T_0$. And when the measured road surface temperature T is equal to or above the reference temperature $T_0$, it is determined whether the water on the road surface can be in the form of a liquid or not. When the road surface temperature T is below the reference temperature $T_0$, the procedure immediately goes to step S7 without determining whether the water on the road surface can be in the form of a liquid. In the example of this embodiment, the reference temperature $T_0$ was determined as $T_0=-3°$ C.

Whether the water on the road surface can be in the form of a liquid or not is determined, using the sound pressure level ratio $Q(=P_B/P_A)$. The band power value $P_A$ in a low-frequency area (e.g., 500 Hz) changes with vehicular speed, irrespective of whether the water on the road surface is in the form of a liquid or not. On the other hand, the band power value $P_B$ in a high-frequency area (e.g., 9000 Hz), while it also changes with vehicular speed, presents a larger value when the sound of the tire splashing water is detected. Therefore, the water on the road surface can be in the form of a liquid when the calculated sound pressure level ratio $Q(=P_B/P_A)$ is 1 or above.

In other words, when the road surface temperature T is below the reference temperature $T_0$ or when the sound pressure level ratio $Q(=P_B/P_A)$ is less than 1, it is determined that there is no covering (water or snow) on the road surface, and the procedure goes to step S7. Or when the road surface temperature T is equal to or above the reference temperature $T_0$ and also when the sound pressure level ratio $Q(=P_B/P_A)$ is 1 or more, it is determined that there is some covering on the road surface, and the procedure goes to step S6.

In step S6, it is determined whether the covering on the road surface is water or snow, that is, whether the road surface is a shallowly wet road or a shallowly sherbet-like snowy road. In the same way as in step S3, the determination in this step can be made such that when f'3≥0, where f'3 is a function value found by substituting the band values $P_{52}$, $P_{31}$, $P_{41}$, and $P_{53}$ in the discriminant function F'3, the road surface is determined to be a shallowly wet road, and when f'3<0, it is determined to be a shallowly sherbet-like snowy road. Note that the determination can also be made, using f3, which is a function value found by substituting the band values $P_{52}$ and $P_{345}$ in the discriminant function F3.

Finally, in step S7 and step S8, it is determined whether the road surface is a compacted snowy road or a dry road.

Figure 13:
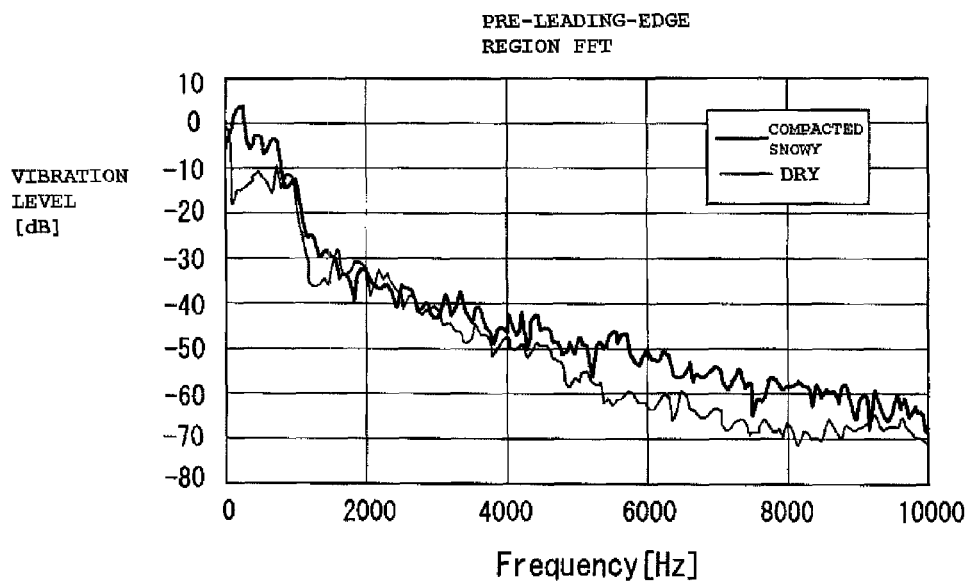
FIG. 13 is a diagram showing another example of frequency spectrums in the pre-leading-edge region.

As evidenced by the frequency spectrums in the pre-leading-edge region R1 in FIG. 13, the band value $P_{11}$ selected from a band of 2 kHz to 8 kHz of the pre-leading-edge region R1 and the band value $P_{13}$ selected from a frequency range of 1 kHz and below are of values larger for rough road surfaces. That is, the band value $P_{11}$ and the band value $P_{13}$ have larger values for a compacted snowy road than for a smooth dry road. Although not shown, it is to be noted that the band value $P_{11}$ and the band value $P_{13}$ are larger for a rough dry road than for a smooth dry road.

Figure 14:
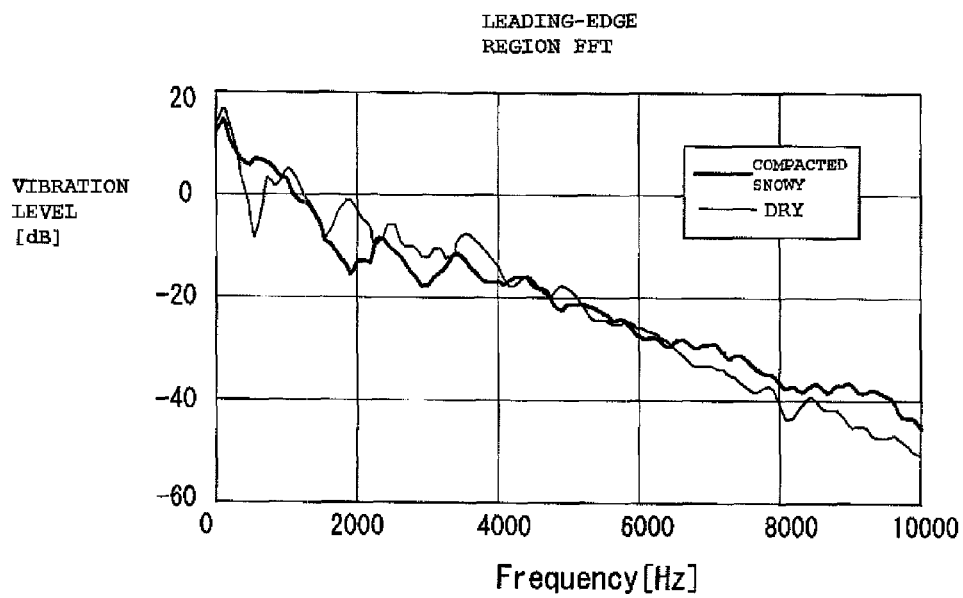
FIG. 14 is a diagram showing another example of frequency spectrums in the leading-edge region.
Figure 15:
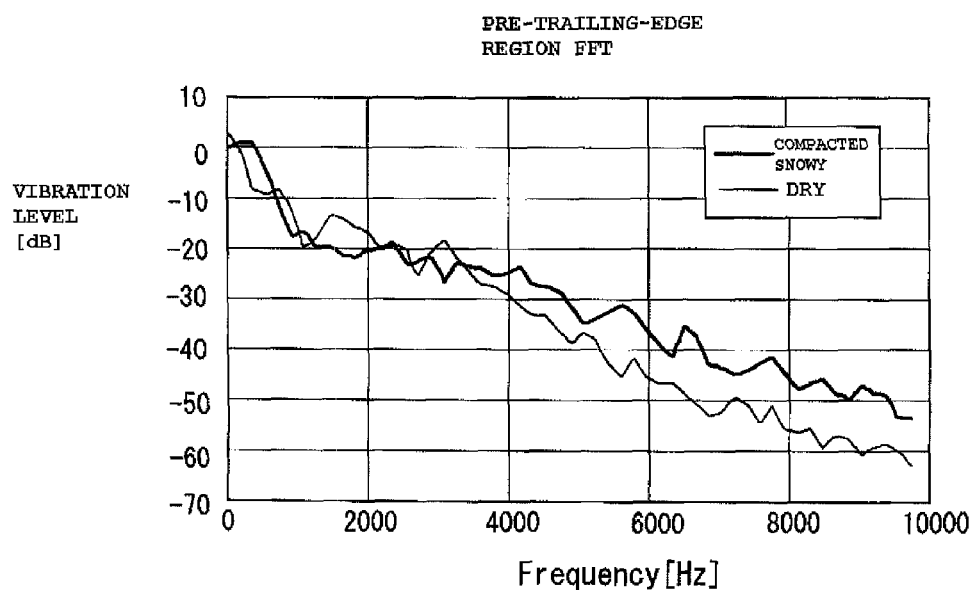
FIG. 15 is a diagram showing another example of frequency spectrums in the pre-trailing-edge region.

Also, on a compacted snowy road, the impact to the tire as it engages the road surface is reduced by the snow. Therefore, as evidenced by the frequency spectrums in the leading-edge region R2 in FIG. 14 and the frequency spectrums in the pre-trailing-edge region R3 in FIG. 15, the band value $P_{22}$ selected from a band of 2 kHz to 4 kHz of the leading-edge region R2 and the band value $P_{32}$ selected from a band of 2 kHz to 4 kHz of the pre-trailing-edge region R3 are of values smaller for a compacted snowy road than for a dry road. However, on a compacted snowy road, small slips within the contact patch of the tire are caused by the snow. Therefore, the band value $P_{23}$ selected from a band of 4 kHz to 10 kHz of the leading-edge region R2 and the band value $P_{33}$ selected from a band of 4 kHz to 10 kHz of the pre-trailing-edge region R3 are of values larger for a compacted snowy road than for a dry road.

Figure 16:
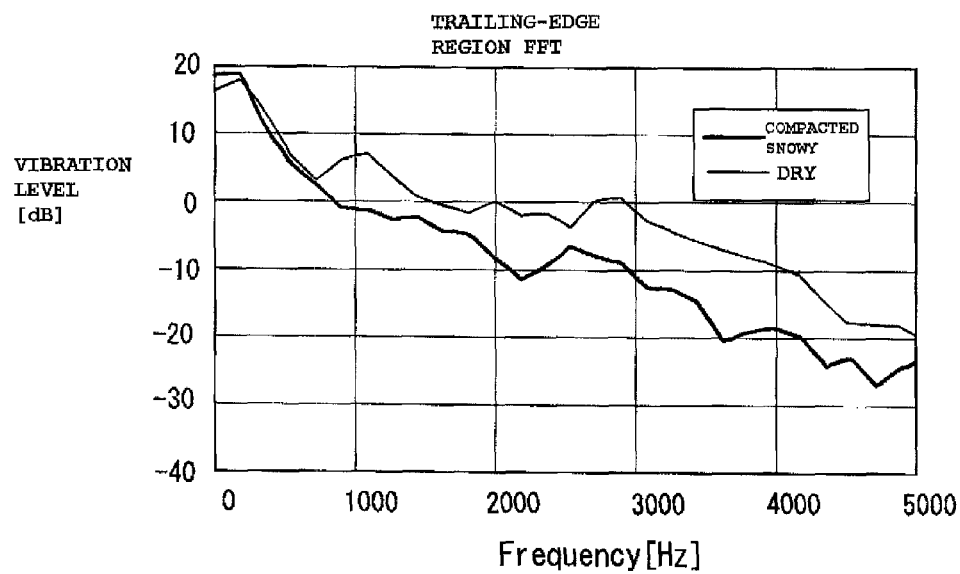
FIG. 16 is a diagram showing an example of frequency spectrums in the trailing-edge region.
Figure 17:
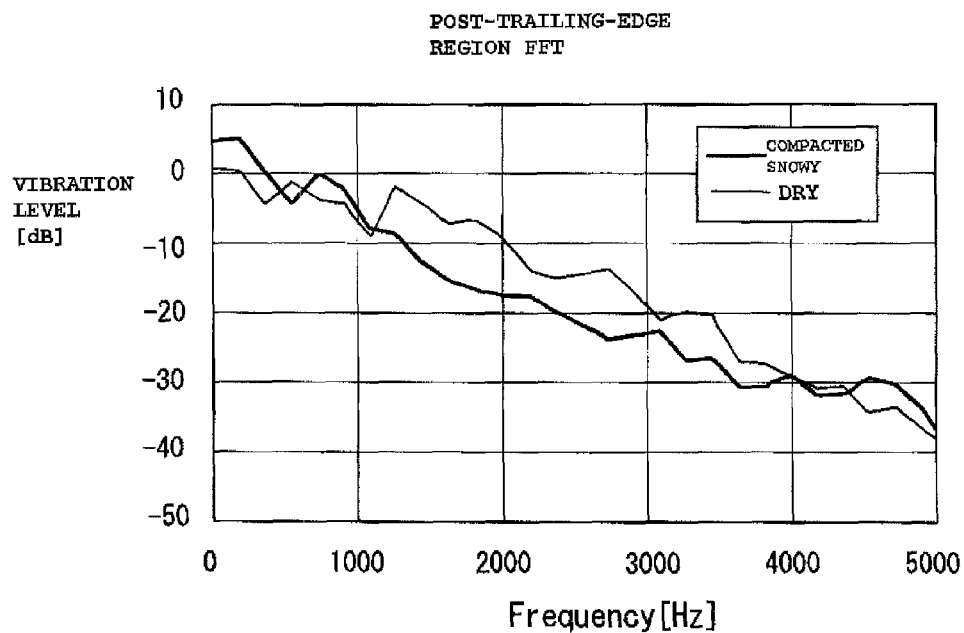
FIG. 17 is a diagram showing another example of frequency spectrums in the post-trailing-edge region.
Figure 18:
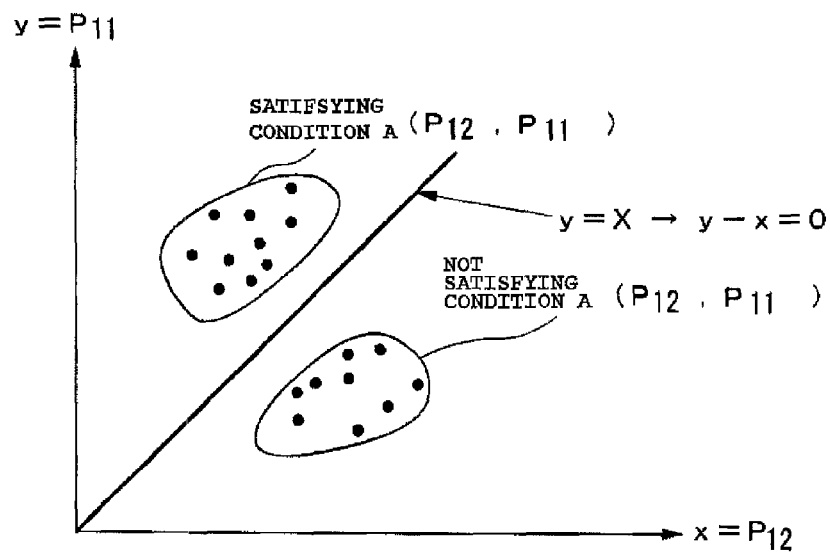
FIG. 18 is a diagram for explaining the discriminant functions.

Further, a slippery road surface causes a drop in the shear force of the tire as it disengages the road surface. Therefore, as evidenced by the frequency spectrums in the trailing-edge region R4 in FIG. 16 and the frequency spectrums in the post-trailing-edge region R5 in FIG. 17, the band value $P_{42}$ selected from a band of 1 kHz to 4 kHz of the trailing-edge region R4 and the band value $P_{51}$ selected from a band of 1 kHz to 4 kHz of the post-trailing-edge region R5 are smaller. Therefore, this can also be used in distinguishing between a compacted snowy road and a dry road.

In step S7, $F'7=w'_{71}\cdot P_{11}+w'_{72}\cdot P_{13}+w'_{73}\cdot P_{22}+w'_{74}\cdot P_{23}+w'_{75}\cdot P_{32}+w'_{76}\cdot P_{33}+w'_{77}\cdot P_{42}+w'_{78}\cdot P_{51}-K'7$ is set as the discriminant function for distinguishing the road surface during vehicular travel into a smooth dry road, a compacted snowy road, and a rough dry road. And the road surface during vehicular travel is determined to be a smooth dry road when f'7, which is a function value found by substituting the band values $P_{11}$, $P_{13}$, $P_{22}$, $P_{23}$, $P_{32}$, $P_{33}$, $P_{42}$, and $P_{51}$ in the predetermined discriminant function F'7, satisfies f'7≥0. On the other hand, the road surface is determined to be a compacted snowy road or a rough dry road when f'7<0, and the procedure goes to step S8.

Also, the arrangement may also be such that a band value $P_{455}$ selected from a band of 1 kHz to 4 kHz of the region R450 covering the trailing-edge region R4 and the post-trailing-edge region R5, in place of the band values $P_{42}$ and $P_{51}$, is obtained, and the road surface during vehicular travel is determined to be a smooth dry road when f7, which is a function value found by substituting the band values $P_{11}, P_{13}, P_{22}, P_{23}, P_{32}, P_{33}$, and $P_{450}$ in the predetermined discriminant function $F7=w_{71} \cdot P_{11}+w_{72} \cdot P_{13}+w_{73} \cdot P_{22}+w_{74} \cdot P_{23}+w_{75} \cdot P_{32}+w_{76} \cdot P_{33}+w_{77} \cdot P_{450}-K7$, satisfies $f7 \geq 0$.

In step S8, $F8=w_{81} \cdot P_{11}+w_{82} \cdot P_{13}+w_{83} \cdot P_{22}+w_{84} \cdot P_{23}+w_{85} \cdot P_{32}+w_{86} \cdot P_{33}+w_{87} \cdot P_{42}+w_{88} \cdot P_{51}-K8$ is set as the discriminant function for distinguishing the road surface into a compacted snowy road and a rough dry road. And the road surface during vehicular travel is determined to be a rough dry road when f8, which is a function value found by substituting the band values $P_{11}, P_{13}, P_{22}, P_{23}, P_{32}, P_{33}, P_{42}$, and $P_{51}$ in the predetermined discriminant function F8, satisfies $f8 \geq 0$. And the road surface during vehicular travel is determined to be a compacted snowy road when $f8<0$.

Note that the discriminant function F7 and the discriminant function F8 were calculated from the data on the set of band values ($P_{11}, P_{13}, P_{22}, P_{23}, P_{32}, P_{33}, P_{42}$, and $P_{51}$) actually determined by operating a vehicle on smooth dry roads, rough dry roads, and compacted snowy roads, using a known method such as least-square, Mahalanobis' generalized distance, or SVM. And the coefficient $w_{mn}$ of the discriminant function F7 is naturally different from the coefficient $w_{mn}$ of the discriminant function F8.

Thus, according to the present embodiment, vibrations of a tire 10 in the circumferential direction, road surface temperature T, and tire-generated sound are detected by an acceleration sensor 11, a road surface thermometer 21, and a microphone 22, respectively. Then band values $P_{11}, P_{12}$ and $P_{13}$ for a pre-leading-edge region R1, band values $P_{21}, P_{22}$ and $P_{23}$ for a leading-edge region R2, band values $P_{31}, P_{32}$ and $P_{33}$ for a pre-trailing-edge region R3, band values $P_{41}$ and $P_{42}$ for a trailing-edge region R4, and band values $P_{51}, P_{52}$ and $P_{53}$ for a post-trailing-edge region R5 are calculated from the vibration data of the tire 10. A sound pressure level ratio $Q=(P_A/P_B)$, which is the ratio of a band power value $P_A$ of a low frequency band to a band power value $P_B$ of a high frequency band, is calculated from data on the tire-generated sound. And a road surface condition is estimated, using band values $P_{ij}$, road surface temperature data T, sound pressure level ratio Q, and wheel speed data. Therefore, a snowy road condition can be estimated in finer classification, and also the road surface condition can be estimated with high accuracy.

Also, discriminant functions Fk for determinations are obtained in advance, and a road surface condition is determined according to the function value fk found by substituting the band values $P_{ij}$ in the Fk being positive or negative. Therefore, the accuracy of estimation of a road surface condition can be markedly enhanced.

In the foregoing embodiments, the band values $P_{ij}$ are obtained by passing the time-series waveforms in the regions R1 to R5 of tire vibrations in the circumferential direction through bandpass filters. However, the band values $P_{ij}$ may be obtained from the frequency spectrums derived by an FFT analysis on the time-series waveforms.

Also, in the foregoing embodiments, the band values $P_{ij}$ are those of tire vibrations in the circumferential direction. However, the arrangement may be such that the band values $P'_{ij}$ of tire vibrations in the axial direction are obtained by changing the detecting direction of the acceleration sensor 11 to the axial direction of the tire and a road surface condition is estimated, using the band values $P'_{ij}$. However, tire vibrations in the axial direction are of smaller amplitude than tire vibrations in the circumferential direction. Therefore, the use of tire vibrations in the circumferential direction, as in the foregoing embodiments, is preferable for higher accuracy of estimation.

Also, in the foregoing embodiments, electric power is supplied from a vehicle-side power feeder 32 to a power supply unit 16. However, the arrangement may be such that electric power is supplied to the power supply unit 16 by intra-tire power generation. A unit for intra-tire power generation may be, for instance, a power-generating unit that is made up of a magnetized rotor turnable by the revolution of the tire 10, a stator of high-permeability material disposed adjacent to the rotor, and a magneto coil disposed within a magnetic circuit including the rotor and the stator.

Also, in the foregoing embodiments, a road surface condition is estimated by detecting vibrations of the tire 10, road surface temperature T, and tire-generated sound. However, the estimation of a snowy road in finer classification can also be accomplished by estimating the road surface condition using only the data on tire vibrations in the circumferential direction. In this case, a shallowly sherbet-like snowy road will be determined to be a deeply sherbet-like snowy road, a dry road, or a compacted snowy road, whereas a shallowly wet road will be determined to be a deeply wet road, a compacted snowy road, or a dry road. Yet, a drop in the accuracy of estimation can be avoided by changing the setting value for distinguishing between "deeply" and "shallowly" and preparing a discriminamt function F1 and a discriminamt function F2 to be used in the determination of a covering in step S1. Also, in carrying out such a road surface determination, the steps S5 and S6 in the flowchart of FIG. 6 may be omitted.

Also, the snowy road condition only can be estimated in finer classification, using the method for estimating a road surface condition of the present invention.

That is, to estimate whether the road surface is a snowy road or not, it is determined whether f1, which is a function value found by substituting the band values $P_{11}$ and $P_{12}$ of tire vibrations in the circumferential direction detected by an acceleration sensor 11 in a predetermined discriminant function $F1=w_{11} \cdot P_{11}+w_{12} \cdot P_{12}-K1$, satisfies $f1 \geq 0$ or not and also whether f2, which is a function value found by substituting the band values $P_{21}$ and $P_{51}$ in a predetermined discriminant function $F2=w_{21} \cdot P_{21}+w_{22} \cdot P_{51}-K2$, satisfies $f2<0$ or not. And when $f1 \geq 0$ and also $f2<0$, the road surface during vehicular travel may be determined to be a snowy road. On the other hand, if $f1<0$ or $f2 \geq 0$, then the road surface is not a snowy road. Otherwise, the following estimations of snowy road conditions are to be performed.

To estimate whether the road surface is a sherbet-like snowy road or not, it is determined whether f'3, which is a function value found by substituting the band values $P_{52}, P_{31}, P_{41}$, and $P_{53}$ in a predetermined discriminant function $F'3=w'_{31} \cdot P_{52}+w'_{32} \cdot P_{31}+w'_{33} \cdot P_{41}+w'_{34} \cdot P_{53}-K'3$, satisfies $f'3<0$ or not. And when $f'3<0$, the road surface during vehicular travel may be determined to be a sherbet-like snowy road.

Also, to estimate whether the road surface is an icy road or not, it is determined whether f'4, which is a function value found by substituting the band values $P_{42}$ and $P_{51}$ in a predetermined discriminant function $F'4=w'_{41} \cdot P_{42}+w'_{42} \cdot P_{51}-K'4$, satisfies $f'4<0$ or not. And when $f'4<0$, the road surface during vehicular travel may be determined to be an icy road.

Also, to estimate whether the road surface is a compacted snowy road or not, it is determined whether f'7, which is a function value found by substituting the band values $P_{11}, P_{13}, P_{22}, P_{23}, P_{32}, P_{33}, P_{42}$, and $P_{51}$ in a predetermined discriminant function $F'7=w'_{71} \cdot P_{11}+w'_{72} \cdot P_{13}+w'_{73} \cdot P_{22}+w'_{74} \cdot P_{23}+w'_{75} \cdot P_{32}+w'_{76} \cdot P_{33}+w'_{77} \cdot P_{42}+w'_{78} \cdot P_{51}-K'7$, satisfies $f'7<0$ or not and also whether f8, which is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F8 = w_{81} \cdot P_{11} + w_{82} \cdot P_{13} + w_{83} \cdot P_{22} + w_{84} \cdot P_{23} + w_{85} \cdot P_{32} + w_{86} \cdot P_{33} + w_{87} \cdot P_{42} + w_{88} \cdot P_{51} - K8$, satisfies f8<0 or not. And when f7<0 and also f8<0, the road surface during vehicular travel may be determined to be a compacted snowy road.

EXAMPLE

A four-wheel-drive vehicle was used as a test vehicle. An infrared temperature sensor is attached to the bumper, an acceleration sensor to the inner liner portion of the left front wheel, and a microphone to a lower part of the vehicle before the left rear wheel. The vehicle was operated on ordinary roads in Hokkaido in winter to test the estimation of road surface conditions.

Table 1 shows the resultant percentages of correct estimations to the visual determinations from within the vehicle during travel. Also note that the tire size was 265/65R17 and the travel speed was 60 km/h.

TABLE 1

| Road surface | Dry | Wet | Sherbet | Snowy | Compacted snowy | Icy |
|---|---|---|---|---|---|---|
| Correct estimation (%) | 97 | 86 | 57 | 79 | 77 | 60 |

As is clear from Table 1, it has been confirmed that the method according to the present invention can be used for the estimation of a snowy road condition in finer classification. The inventors consider the low percentages of correct estimations for sherbet-like snowy roads and icy roads due to the visual determination of reference road surface conditions from within the vehicle. The viewers found it difficult to distinguish between sherbet-like snow and ice on the compacted snowy road.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

Industrial Applicability

As thus far described herein, the present invention makes it possible to estimate a road surface condition during vehicular travel with accuracy and also estimate a snowy road condition in finer classification. Therefore, the running safety of vehicles can be improved if the estimated road surface condition is well communicated to the driver or the running of the vehicle is controlled based on the estimated road surface conditions.

DESCRIPTION OF REFERENCE NUMERALS 1 road surface condition estimating system
10 tire
11 acceleration sensor
12 amplifier
13 AD converter
14 tire-side transmitter
15 power receiver
16 power supply unit
20 vehicle body
20M vehicle interior
21 road surface thermometer
22 microphone
23 wheel speed sensor
24 monitoring acceleration sensor
25 camera
26 GPS
27 arithmetic unit
28 road surface information recording means
29 monitor
30 receiver
31 vehicle-side transmitter
32 power feeder
33 alarm unit
40 control center
41 data server
42 display unit

The invention claimed is:

1. A method for estimating a road surface condition, comprising the steps of:
   (a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak;
   (b) obtaining from the time-series waveform:
   a band value $P_{11}$ selected from a band of 2 kHz to 8 kHz of the pre-leading-edge region R1, a band value $P_{12}$ selected from a band of 0.5 kHz to 1.5 kHz of the pre-leading-edge region R1, a band value $P_{21}$ selected from a band of 1 kHz to 3 kHz of the leading-edge region R2, and a band value $P_{51}$ selected from a band of 1 kHz to 4 kHz of the post-trailing-edge region R5; and
   (c) estimating whether the road surface during vehicular travel is a snowy road or not, based on the magnitude of the band values $P_{11}$, $P_{12}$, $P_{21}$, and $P_{51}$,
   wherein, in the step (c), the road surface during vehicular travel is estimated to be a snowy road when f1≥0 and also f2 <0, where f1 is a function value found by substituting the band values $P_{11}$ and $P_{12}$ in a predetermined discriminant function $F1 = w_{11} \cdot P_{11} + w_{12} \cdot P_{12} - K1$ and f2 is a function value found by substituting the band values $P_{21}$ and $P_{51}$ in a predetermined discriminant function $F2 = w_{21} \cdot P_{21} + w_{22} \cdot P_{51} - K2$.

2. A method for estimating a road surface condition, comprising the steps of:
   (a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak;

(d) obtaining from the time-series waveform:
a band value $P_{52}$ selected from a band of 2 kHz to 4 kHz of the post-trailing-edge region R5 and a band value $P_{345}$ selected from a band of 7 kHz to 10 kHz of the region R345 covering the pre-trailing-edge region R3, the trailing-edge region R4, and the post-trailing-edge region R5 or obtaining from the time-series waveform:
a band value $P_{52}$ selected from a band of 2 kHz to 4 kHz of the post-trailing-edge region R5, a band value $P_{31}$ selected from a band of 7 kHz to 10 kHz of the pre-trailing-edge region R3, a band value $P_{41}$ selected from a band of 7 kHz to 10 kHz of the trailing-edge region R4, and a band value $P_{53}$ selected from a band of 7 kHz to 10 kHz of the post-trailing-edge region R5; and (e) estimating whether the road surface during vehicular travel is a sherbet-like snowy road or not, based on the magnitude of the band values $P_{52}$ and $P_{345}$ or the magnitude of $P_{52}$, $P_{31}$, $P_{41}$, and $P_{53}$,
wherein, in the step (e), the road surface during vehicular travel is estimated to be a sherbet-like snowy road when f3 <0, where f3 is a function value found by substituting the band values $P_{52}$ and $P_{345}$ in a predetermined discriminant function $F3=w_{31} \cdot P_{52}+w_{32} \cdot P_{345}-K3$, or when f'3 <0, where f'3 is a function value found by substituting the band values $P_{52}$, $P_{31}$, $P_{41}$, and $P_{53}$ in a predetermined discriminant function $F'3=w'_{31} \cdot P_{52}+W'_{32} \cdot P_{31}+w'_{33} \cdot P_{41}+w'_{34} \cdot P_{53}-K'3$.

3. A method for estimating a road surface condition, comprising the steps of:
(a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak;

(f) obtaining from the time-series waveform:
a band value $P_{450}$ selected from a band of 1 kHz to 4 kHz of the region R450 covering the trailing-edge region R4 and the post-trailing-edge region R5 or obtaining from the time-series waveform:
a band value $P_{42}$ selected from a band of 1 kHz to 4 kHz of the trailing-edge region R4 and a band value $P_{51}$ selected from a band of 1 kHz to 4 kHz of the post-trailing-edge region R5; and (g) estimating whether the road surface during vehicular travel is an icy road or not, based on or the magnitude of the band value $P_{450}$ or the magnitude of the band values $P_{42}$ and $P_{51}$,
wherein, in the step (g), the road surface during vehicular travel is estimated to be an icy road when f4 <0, where f4 is a function value found by substituting the band value $P_{450}$ in a predetermined discriminant function $F4=w_{41} \cdot P_{450}-K4$, or when f'4 <0, where f'4 is a function value found by substituting the band values $P_{42}$ and $P_{51}$ in a predetermined discriminant function $F'4=w'_{41} \cdot P_{42}+w'_{42} \cdot P_{51}-K'4$.

4. A method for estimating a condition of road surface, comprising the steps of:
(a) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak;

(h) obtaining from the time-series waveform:
a band value $P_{11}$ selected from a band of 2 kHz to 8 kHz of the pre-leading-edge region R1, a band value $P_{13}$ selected from a band of 1 kHz or below of the pre-leading-edge region R1, a band value $P_{22}$ selected from a band of 2 kHz to 4 kHz of the leading-edge region R2, a band value $P_{23}$ selected from a band of 4 kHz to 10 kHz of the leading-edge region R2, a band value $P_{32}$ selected from a band of 2 kHz to 4 kHz of the pre-trailing-edge region R3, a band value $P_{33}$ selected from a band of 4 kHz to 10 kHz of the pre-trailing-edge region R3, a band value $P_{42}$ selected from a band of 1 kHz to 4 kHz of the trailing-edge region R4, and a band value $P_{51}$ selected from a band of 1 kHz to 4 kHz of the post-trailing-edge region R5; and (i) estimating whether the road surface during vehicular travel is a compacted snowy road or not, based on the magnitude of the band values $P_{11}$, $P_{13}$, $P_{22}$, $P_{23}$, $P_{32}$, $P_{33}$, $P_{42}$, and $P_{51}$,
wherein, in the step (i), the road surface during vehicular travel is estimated to be a compacted snowy road when f'7 <0 and also f8 <0, where f'7 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F'7=w'_{71} \cdot P_{11}+w'_{72} \cdot P_{13}+w'_{73} \cdot P_{22}+w'_{74} \cdot P_{23}+w'_{75} \cdot P_{32}+w'_{76} \cdot P_{33}+w'_{77} \cdot P_{42}+w'_{78} \cdot P_{51}-K'7$ and f8 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F8=w_{81} \cdot P_{11}+w_{82} \cdot P_{13}+w_{83} \cdot P_{22}+w_{84} \cdot P_{23}+w_{85} \cdot P_{32}+w_{86} \cdot P_{33}+w_{87} \cdot P_{42}+w_{88} \cdot P_{51}-K8$.

5. A method for estimating a road surface condition, comprising the steps of:
(A) dividing a time-series waveform of tire vibrations in a circumferential direction or in an axial direction during vehicular travel detected by an acceleration sensor installed within the tire into a pre-leading-edge region R1, which precedes a leading-edge peak appearing at the leading edge of contact patch, a leading-edge region R2, which is the region constituting the leading-edge peak, a pre-trailing-edge region R3, which falls between the leading-edge peak and a trailing-edge peak appearing at the trailing edge, a trailing-edge region R4, which is the region constituting the trailing-edge peak, and a post-trailing-edge region R5, which follows the trailing-edge peak;

(B) obtaining from the time-series waveform a band value $P_{11}$ selected from a band of 2 kHz to 8 kHz of the pre-leading-edge region R1 and a band value $P_{12}$ selected from a band of 0.5 kHz to 1.5 kHz of the pre-leading-edge region R1, and determining whether f1, which is a function value found by substituting the band values $P_{11}$ and $P_{12}$ in a predetermined discriminant function $F1=w_{11} \cdot P_{11}+w_{12} \cdot P_{12}-K1$, satisfies f1≥0 or not;

(C) when f1≥0 in step (B), obtaining a band value $P_{21}$ selected from a band of 1 kHz to 3 kHz of the leading-edge region R2 and a band value $P_{51}$ selected from a band of 1 kHz to 4 kHz of the post-trailing-edge region R5, determining whether f2, which is a function value found by substituting the band values $P_{21}$ and $P_{51}$ in a predetermined discriminant function $F2=w_{21} \cdot P_{21}+w_{22} \cdot P_{51}-K2$, satisfies f2<0 or not, and estimating the road surface during vehicular travel to be a snowy road when f2<0;

(D) when f2≥0 in step (C), obtaining a band value $P_{52}$ selected from a band of 2 kHz to 4 kHz of the post-trailing-edge region R5 and a band value $P_{345}$ selected from a band of 7 kHz to 10 kHz of the region R345 covering the pre-trailing-edge region R3, the trailing-edge region R4, and the post-trailing-edge region R5 or obtaining a band value $P_{52}$ selected from a band of 2 kHz to 4 kHz of the post-trailing-edge region R5, a band value $P_{31}$ selected from a band of 7 kHz to 10 kHz of the pre-trailing-edge region R3, a band value $P_{41}$ selected from a band of 7 kHz to 10kHz of the trailing-edge region R4, and a band value $P_{53}$ selected from a band of 7 kHz to 10kHz of the post-trailing-edge region R5, determining whether f3, which is a function value found by substituting the band values $P_{52}$ and $P_{345}$ in a predetermined discriminant function $F3=w_{31} \cdot P_{52}+w_{32} \cdot P_{345}-K3$, satisfies f3 <0 or not, or whether f'3, which is a function value found by substituting the band values $P_{52}$, $P_{31}$, $P_{41}$, and $P_{53}$ in a predetermined discriminant function $F'3=w'_{31} \cdot P_{52}+w'_{32} \cdot P_{31}+w'_{33} \cdot P_{41}+w'_{34} \cdot P_{53}-K'3$, satisfies f'3 <0 or not, and estimating the road surface during vehicular travel to be a sherbet-like snowy road when f3<0 or f'3<0 or estimating the road surface to be a wet road when f3≥0 or f'3≥0;

(E) when f1<0 in step (B), obtaining a band value $P_{450}$ selected from a band of 1 kHz to 4 kHz of the region R450 covering the trailing-edge region R4 and the post-trailing-edge region R5 or obtaining a band value $P_{42}$ selected from a band of 1 kHz to 4 kHz of the trailing-edge region R4 and a band value $P_{51}$ selected from a band of 1 kHz to 4 kHz of the post-trailing-edge region R5, and estimating the road surface to be an icy road when f4<0, where f4 is a function value found by substituting the band value $P_{450}$ in a predetermined discriminant function $F4=w_{41} \cdot P_{450}-K4$, or when f'4<0, where f'4 is a function value found by substituting the band values $P_{42}$ and $P_{51}$ in a predetermined discriminant function $F'4=w'_{41} \cdot P_{42}+w'_{42} \cdot P_{51}-K'4$;

(F) when f4≥0 or f'4≥0 in step (E), obtaining a band value $P_{11}$ selected from a band of 2 kHz to 8 kHz of the pre-leading-edge region R1, a band value $P_{13}$ selected from a band of 1kHz or below of the pre-leading-edge region R1, a band value $P_{22}$ selected from a band of 2 kHz to 4 kHz of the leading-edge region R2, a band value $P_{23}$ selected from a band of 4 kHz to 10kHz of the leading-edge region R2, a band value $P_{32}$ selected from a band of 2 kHz to 4 kHz of the pre-trailing-edge region R3, a band value $P_{33}$ selected from a band of 4 kHz to 10 kHz of the pre-trailing-edge region R3, and a band value $P_{450}$ selected from a band of 1 kHz to 4 kHz of the region R450 covering the trailing-edge region R4 and the post-trailing-edge region R5 or obtaining a band value $P_{11}$ selected from a band of 2 kHz to 8 kHz of the pre-leading-edge region R1, a band value $P_{13}$ selected from a band of 1 kHz or below of the pre-leading-edge region R1, a band value $P_{22}$ selected from a band of 2 kHz to 4 kHz of the leading-edge region R2, a band value $P_{23}$ selected from a band of 4 kHz to 10 kHz of the leading-edge region R2, a band value $P_{32}$ selected from a band of 2 kHz to 4 kHz of the pre-trailing-edge region R3, a band value $P_{33}$ selected from a band of 4 kHz to 10 kHz of the pre-trailing-edge region R3, a band value $P_{42}$ selected from a band of 1 kHz to 4 kHz of the trailing-edge region R4, and a band value $P_{51}$ selected from a band of 1 kHz to 4 kHz of the post-trailing-edge region R5, and estimating the road surface during vehicular travel to be a smooth dry road when f7≥0, where f7 is a function value found by substituting the band values $P_{11}$, $P_{13}$, $P_{22}$, $P_{23}$, $P_{32}$, $P_{33}$, and $P_{450}$ in a predetermined discriminant function $F7=w_{71} \cdot P_{11}+w_{72} \cdot P_{13}+w_{73} \cdot P_{22}+w_{74} \cdot P_{23}+w_{75} \cdot P_{32}+w_{76} \cdot P_{33}+w_{77} \cdot P_{450}-K7$ or when f'7≥0, where f'7 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F'7=w'_{71} \cdot P_{11}+w'_{72} \cdot P_{13}+w'_{73} \cdot P_{22}+w'_{74} \cdot P_{23}+w'_{75} \cdot P_{32}+w'_{76} \cdot P_{33}+w'_{77} \cdot P_{42}+w'_{78} \cdot P_{51}-K'7$; and (G) when f7 <0 or f'7 <0 in step (F), estimating the road surface during vehicular travel to be a compacted snowy road if f8 <0 or estimating the road surface during vehicular travel to be a rough dry road surface if f8≥0, where f8 is a function value found by substituting the band values $P_{11}$, $P_{13}$, $P_{22}$, $P_{23}$, $P_{32}$, $P_{33}$, $P_{42}$, and $P_{51}$ in a predetermined discriminant function $F8=w_{81} \cdot P_{11}+w_{82} \cdot P_{13}+w_{83} \cdot P_{22}+w_{84} \cdot P_{23}+w_{85} \cdot P_{32}+w_{86} \cdot P_{33}+w_{87} \cdot P_{42}+w_{88} \cdot P_{51}-K8$.

6. The method for estimating a road surface condition according to claim 5, further comprising, between the steps of (E) and (F), the steps of:

(H) detecting road surface temperature and tire-generated sound during vehicular travel;

(I) obtaining a band power value $P_A$ in a low-frequency band and a band power value $P_B$ in a high-frequency band calculated from an octave distribution waveform of 10 Hz to 10 kHz of the tire-generated sound; and (J) determining whether or not there is any covering on the road surface from the road surface temperature and the band power values $P_A$ and $P_B$;

wherein, in the step (I), it is determined that there is no covering on the road surface if the road surface temperature is lower than a predetermined reference temperature or if the sound pressure level ratio Q, which is the ratio of the band power value $P_B$ in a high-frequency band to the band power value $P_A$ in a low-frequency band ($P_B/P_A$), is less than 1, and the procedure goes on to step (F), or if it is determined that there is a covering on the road surface in the step (I), a band value $P_{52}$ selected from a band of 2 kHz to 4 kHz of the post-trailing-edge region R5 and a band value $P_{345}$ selected from a band of 7 kHz to 10 kHz of the region R345 covering the pre-trailing-edge region R3, the trailing-edge region R4, and the post-trailing-edge region R5 are obtained or a band value $P_{52}$ selected from a band of 2 kHz to 4 kHz of the post-trailing-edge region R5, a band value $P_{31}$ selected from a band of 7 kHz to 10 kHz of the pre-trailing-edge region R3, a band value $P_{41}$ selected from a band of 7 kHz to 10 kHz of the trailing-edge region R4, and a band value $P_{53}$ selected from a band of 7 kHz to 10 kHz of the post-trailing-edge region R5 are obtained, then it is determined whether f3≥0 or f'3≥0, where f3 is a function value found by substituting the band values $P_{52}$ and $P_{345}$ in a predetermined discriminant function $F3=w_{31} \cdot P_{52}+w_{32} \cdot P_{345}-K3$ and f'3 is a function value found by substituting the band values $P_{52}$, $P_{31}$, $P_{41}$, and $P_{53}$ in a predetermined discriminant function $F'3 = w'_{31} \cdot P_{52} + w'_{32} \cdot P_{31} + w'_{33} \cdot P_{41} + w'_{34} \cdot P_{53} - K'3$, and the road surface during vehicular travel is estimated to be a shallowly sherbet-like snowy road when $f3 < 0$ or $f'3 < 0$ or the road surface is estimated to be a shallowly wet road when $f3 \geq 0$ or $f'3 \geq 0$.

7. The method for estimating a road surface condition according to claim 1, wherein a monitoring acceleration sensor is installed on the suspension of the vehicle, and the estimation of a road surface condition is discontinued when the value of acceleration detected by the monitoring acceleration sensor exceeds a predetermined threshold.

8. The method for estimating a road surface condition according to claim 1, wherein images of road surface conditions are captured, the images captured of road surface conditions are displayed on a display screen, and estimated road surface conditions are also displayed on the display screen.

* * * * *